US009636986B2

(12) United States Patent
Versteyhe et al.

(10) Patent No.: US 9,636,986 B2
(45) Date of Patent: May 2, 2017

(54) HYBRID DRIVETRAIN AND METHOD OF OPERATION THEREOF

(71) Applicant: Spicer Off-Highway Belgium N.V., Bruges (BE)

(72) Inventors: Mark R. J. Versteyhe, Oostkamp (BE); Thibaut E. Duchene, Woluwe-Saint-Lambert (BE)

(73) Assignee: Dana Limited, Maumee, OH (US)

( * ) Notice: Subject to any disclaimer, the term of this patent is extended or adjusted under 35 U.S.C. 154(b) by 179 days.

(21) Appl. No.: 14/044,642

(22) Filed: Oct. 2, 2013

(65) Prior Publication Data

US 2014/0094336 A1 Apr. 3, 2014

Related U.S. Application Data

(60) Provisional application No. 61/709,332, filed on Oct. 3, 2012.

(51) Int. Cl.
| | |
|---|---|
| *B60K 6/10* | (2006.01) |
| *B60K 6/365* | (2007.10) |
| *B60K 6/387* | (2007.10) |
| *B60K 6/40* | (2007.10) |
| *B60K 6/48* | (2007.10) |

(52) U.S. Cl.
CPC .............. *B60K 6/105* (2013.01); *B60K 6/365* (2013.01); *B60K 6/387* (2013.01); *B60K 6/40* (2013.01); *B60K 6/48* (2013.01); *B60K 2006/4825* (2013.01); *Y02T 10/6204* (2013.01); *Y02T 10/6221* (2013.01); *Y02T 10/6252* (2013.01); *Y02T 10/6282* (2013.01); *Y02T 10/92* (2013.01)

(58) Field of Classification Search
None
See application file for complete search history.

(56) References Cited

U.S. PATENT DOCUMENTS

| | | | |
|---|---|---|---|
| 3,936,683 A | | 2/1976 | Walker |
| 4,588,040 A | * | 5/1986 | Albright, Jr. ............ B60K 6/30 180/165 |

(Continued)

FOREIGN PATENT DOCUMENTS

| | | |
|---|---|---|
| JP | 2002-357247 | 12/2002 |
| WO | 01/54856 | 8/2001 |

(Continued)

*Primary Examiner* — Colby M Hansen
(74) *Attorney, Agent, or Firm* — Marshall & Melhorn, LLC

(57) ABSTRACT

A driveline for a vehicle is provided. The driveline includes a power source, a planetary gearset, a lockout clutch, a transmission, and a kinetic energy recovery system. The planetary gearset includes a sun gear, a carrier having a plurality of planet gears rotatably disposed thereon, and a ring gear. The power source is in driving engagement with a portion of the planetary gearset. The lockout clutch is capable of placing the planetary gearset in a locked out condition. The transmission is in driving engagement with another portion of the planetary gearset. The kinetic energy recovery system includes an accessory clutch and a flywheel. The accessory clutch facilitates driving engagement between the flywheel and another portion of the planetary gearset. The lockout clutch and the accessory clutch are selectively engaged to facilitate a transfer of energy to and from the transmission and the flywheel.

14 Claims, 7 Drawing Sheets

(56) References Cited

U.S. PATENT DOCUMENTS

| | | | | |
|---|---|---|---|---|
| 5,285,111 A | * | 2/1994 | Sherman | B60K 6/365 |
| | | | | 180/65.25 |
| 5,762,156 A | * | 6/1998 | Bates | B60K 6/30 |
| | | | | 180/165 |
| 6,841,910 B2 | | 1/2005 | Gery | |
| 2001/0054856 A1 | | 12/2001 | Gabrys | |
| 2007/0014980 A1 | | 1/2007 | Spears | |
| 2011/0256972 A1 | * | 10/2011 | Greenwood | B60K 6/105 |
| | | | | 475/1 |
| 2012/0309575 A1 | | 12/2012 | Buffett | |

FOREIGN PATENT DOCUMENTS

| | | |
|---|---|---|
| WO | 2010/109209 | 9/2010 |
| WO | 2010/109210 | 9/2010 |
| WO | 2010/136019 | 12/2010 |

\* cited by examiner

HYBRID DRIVETRAIN AND METHOD OF OPERATION THEREOF

CLAIM OF PRIORITY

The present application claims the benefit of priority to U.S. Provisional Application No. 61/709,332 filed on Oct. 3, 2012, which is incorporated herein in its entirety by reference.

FIELD OF THE INVENTION

The present invention relates to drivelines for vehicles and more particularly to a hybrid driveline including a kinetic energy recovery system.

BACKGROUND OF THE INVENTION

The use of internal combustion engines (hereinafter abbreviated as ICE) has dominated the automotive industry over the last century. However, environmental concerns, dependence on oil, restrictions enforced by governments, and an enormous demand for improved fuel economy has encouraged automotive manufacturers to develop more fuel-efficient and environmentally friendly solutions. Alternative powertrains, meaning that alternative power sources to the ICE are employed to propel a vehicle driveline, is one of the common solutions in the industry. Alternative powertrains typically include turbochargers, fuel cell systems, electric vehicles, hybrid electric vehicles, plug-in electric hybrids, hydraulic hybrids, mechanical hybrids, among others.

Kinetic energy recovery systems (hereinafter abbreviated as KERS), which use a flywheel as an energy storage device, are becoming an important part of hybrid vehicle research. Compared to an alternative such as batteries, which have a great specific energy, flywheels typically store smaller amounts of energy but perform better in terms of specific power. Ultracapacitors and hydraulic accumulators, which also provide strong power characteristics in many hybrid applications, have the disadvantage of being large, heavy, and expensive. Accordingly, flywheel based energy storage device have the advantages of delivering a high amount of power for a relatively small weight, package size, and cost.

Flywheel based energy storage devices are known in the art, and vehicle manufacturers have incorporated such devices in buses, trams, and experimental vehicles. However, as a result of the improvements in the materials used to form flywheels, previous disadvantages such as weight and gyroscopic forces associated with flywheels can be significantly reduced. The use of composite materials such as carbon-fiber polymers, instead of steel, has created a large potential to implement flywheel based energy storage devices in hybrid vehicles.

It would be advantageous to develop a vehicle driveline including a flywheel that improves a fuel economy of a vehicle, permits a size of a power source to be reduced, reduces vehicle emissions, increases a brake life of the vehicle, and reduces maintenance costs associated with the vehicle.

SUMMARY OF THE INVENTION

Presently provided by the invention, a vehicle driveline including a flywheel that improves a fuel economy of a vehicle, permits a size of a power source to be reduced, reduces vehicle emissions, increases a brake life of the vehicle, and reduces maintenance costs associated with the vehicle, has surprisingly been discovered.

In one embodiment, the present invention is directed to a driveline for a vehicle. The driveline includes a power source, a planetary gearset, a lockout clutch, a transmission, and a kinetic energy recovery system. The planetary gearset includes a sun gear, a carrier having a plurality of planet gears rotatably disposed thereon, and a ring gear. The power source is in driving engagement with one of the sun gear, the carrier, and the ring gear. The lockout clutch is positioned to place the planetary gearset in a locked out condition when the lockout clutch is placed in an engaged position. The transmission is in driving engagement with a remaining one of the sun gear, the carrier, and the ring gear. The kinetic energy recovery system comprises an accessory clutch and a flywheel. The accessory clutch facilitates driving engagement between the flywheel and a remaining one of the sun gear, the carrier, and the ring gear when the accessory clutch is placed in an engaged position. The lockout clutch and the accessory clutch are selectively engaged to facilitate a transfer of energy from one of the transmission and the flywheel to a remaining one of the transmission and the flywheel.

In another embodiment, the present invention is directed to a driveline for a vehicle. The driveline includes a power source, a planetary gearset, a lockout clutch, a transmission, and a kinetic energy recovery system. The planetary gearset includes a sun gear, a carrier having a plurality of planet gears rotatably disposed thereon, and a ring gear. The power source is in driving engagement with the ring gear. The lockout clutch is positioned to place the planetary gearset in a locked out condition when the lockout clutch is placed in an engaged position. The transmission is in driving engagement with the carrier. The kinetic energy recovery system includes an accessory clutch, a flywheel, a flywheel housing, and a magnetic coupling having a first portion in driving engagement with the accessory clutch and a second portion disposed in the flywheel housing and in driving engagement with the flywheel. The accessory clutch facilitates driving engagement between the flywheel and the sun gear when the accessory clutch is placed in an engaged position. The lockout clutch and the accessory clutch are selectively engaged to facilitate a transfer of energy from one of the transmission and the flywheel to a remaining one of the transmission and the flywheel.

The present invention also is directed to a method of operating a driveline for a vehicle. The method comprising the steps of providing a power source, providing a planetary gearset, providing a lockout clutch positioned to place the planetary gearset in a locked out condition when the lockout clutch is placed in an engaged position, providing a transmission in driving engagement with a portion of the planetary gearset, providing a kinetic energy recovery system comprising an accessory clutch and a flywheel, and selectively engaging the lockout clutch and the accessory clutch to facilitate a transfer of energy from one of the transmission and the flywheel to a remaining one of the transmission and the flywheel. The planetary gearset includes a sun gear, a carrier having a plurality of planet gears rotatably disposed thereon, and a ring gear. The power source is in driving engagement with one of the sun gear, the carrier, and the ring gear. The accessory clutch has an engaged position which facilitates driving engagement between the flywheel and a remaining one of the sun gear, the carrier, and the ring gear.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
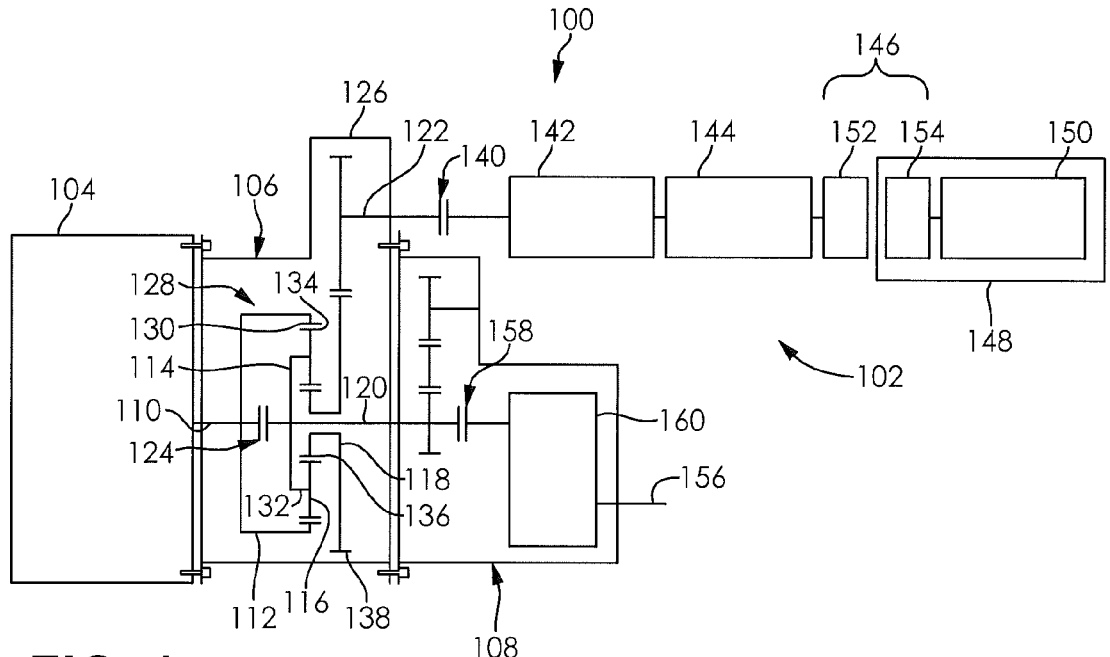
FIG. 1 is a schematic illustration of a driveline including a kinetic energy recovery system according to an embodiment of the present invention.

FIG. 1 illustrates a driveline 100 for a vehicle (not illustrated) according to an embodiment of the invention. The driveline 100 is a hybrid driveline and includes a kinetic energy recovery system 102 (henceforth abbreviated as KERS). The driveline 100 includes a power source 104, a planetary gearset assembly 106, the KERS 102, and a transmission 108.

The power source 104 is coupled to and drivingly engaged with the planetary gearset assembly 106. The planetary gearset assembly 106 is coupled to and drivingly engaged with the transmission 108. The KERS 102 is drivingly engaged with a portion of the planetary gearset assembly 106.

The power source 104 is drivingly engaged with an input shaft 110 of the planetary gearset assembly 106, and applies power thereto. The power source 104 is, for example, an internal combustion engine; however, it is understood that the power source 104 may include an electric motor or another source of rotational output. It is understood that the power source 104 may be a hybrid power source including both an internal combustion engine and an electric motor. Further, it is understood that the power source 104 may include a ratio adjusting device (not shown) as known in the art. Further, it is understood that the power source 104 may include a clutch (not shown) as known in the art, for one of reducing and interrupting a rotational force transferred to the planetary gearset assembly 106.

The planetary gearset assembly 106 includes the input shaft 110, a ring gear 112, a carrier 114 including a plurality of planet gears 116 disposed thereon, a sun gear 118, a first output shaft 120, a second output member 122, and a lockout clutch 124. Each of the components 110, 112, 114, 116, 118, 120, 122, 124 is rotatably disposed in a housing 126 and supported by bearings (not shown). The ring gear 112, the carrier 114, the plurality of planet gears 116, and the sun gear 118 form a planetary gearset 128. The housing 126 is a hollow body which may be formed by coupling a plurality of thin walled members to one another. The housing 126 is coupled to the power source 104 and the transmission 108.

The input shaft 110 is an elongate member having a first end drivingly engaged with the power source 104 and a second end drivingly engaged with both the ring gear 112 and a portion of the lockout clutch 124. The input shaft 110 is a rigid shaft formed from a steel; however, it is understood that the input shaft 110 may be formed from other rigid materials and have other shapes. It is understood that the first end and the second end may be drivingly engaged with the power source 104 and the ring gear 112 and a portion of the lockout clutch 124, respectively, in any conventional manner.

The ring gear 112 is an annular member disposed about a portion of the input shaft 110, the lockout clutch 124, the sun gear 118, the plurality of planet gears 116, and a portion of the first output shaft 120. A plurality of gear teeth (not shown) is formed on an inner surface 130 of the ring gear 112 for drivingly engaging the plurality of planet gears 116. A plurality of splines (not shown) is formed on the ring gear 112 for engaging a portion of the input shaft 110. Alternately, it is understood that the ring gear 112 may include other features for engaging the input shaft 110 or that the input shaft 110 and the ring gear 112 may be unitarily formed.

The carrier 114 comprises a plurality of planet gear journals 132 in an annular array, onto which the plurality of planet gears 116 is rotatably disposed on. Bearings (not shown) may be disposed between each of the planet gear journals 132 and the planet gears 116 however, it is understood that each of the planet gears 116 may be directly disposed on the planet gear journals 132. A plurality of splines (not shown) is formed on the carrier 114 for engaging a portion of the first output shaft 120. Alternately, it is understood that the carrier 114 may include other features for engaging the first output shaft 120.

Each of the plurality of planet gears 116 is an annular member rotatably disposed on the planet gear journals 132 of the carrier 114. A plurality of gear teeth (not shown) is formed on an outer surface 134 of each of the plurality of planet gears 116 for drivingly engaging the sun gear 118 and the ring gear 112.

The sun gear 118 is an annular member disposed about a portion of the first output shaft 120. A plurality of gear teeth (not shown) is formed on a first outer surface 136 of the sun gear 118 for drivingly engaging the plurality of planet gears 116. A plurality of gear teeth (not shown) is also formed on a second outer surface 138 of the sun gear 118 for drivingly engaging the second output member 122.

The first output shaft 120 is an elongate member having a first end drivingly engaged with the transmission 108 and a second end drivingly engaged with both the carrier 114 and a portion of the lockout clutch 124. The first output shaft 120 is a rigid shaft formed from a steel; however, it is understood that the first output shaft 120 may be formed from other rigid materials and have other shapes. It is understood that the first end and the second end may be drivingly engaged with the transmission 108 and the carrier 114 and a portion of the lockout clutch 124, respectively, in any conventional manner.

The second output member 122 is an elongate member having a first end drivingly engaged with the sun gear 118 and a second end drivingly engaged with a portion of the KERS 102. The second output member 122 is a rigid shaft formed from a steel; however, it is understood that the second output member 122 may be formed from other rigid materials and have other shapes. The first end of the second output member 122 is drivingly engaged with the sun gear 118 through a plurality of gear teeth (not shown); however, it is understood that the first end of the second output member 122 may be drivingly engaged with the sun gear 118 in any conventional manner. The second end of the second output member 122 may be drivingly engaged with the portion of the KERS 102 in any conventional manner.

The lockout clutch 124 is a clutching device that may be at least variably engaged. The lockout clutch 124 may be placed in an engaged position, a variably engaged position, and a disengaged position. When placed in the engaged position, the lockout clutch 124 facilitates driving engagement between the input shaft 110 and the first output shaft 120, and thus also between the ring gear 112 and the carrier 114, placing the planetary gearset 128 in a "locked out" condition. When placed in the variably engaged position, the lockout clutch 124 transfers a portion of torque from the input shaft 110 to the first output shaft 120 by bypassing the planetary gearset 128. When placed in the disengaged position, the input shaft 110 is directly disengaged from the first output shaft 120, and all torque from the input shaft 110 is distributed to the carrier 114 and the sun gear 118 (and thus the first output shaft 120 and the second output member 122, respectively) by the ring gear 112 according to epicyclic gearing and specific ratios chosen for use with the planetary gearset 128.

The KERS 102 comprises an accessory clutch 140, an accessory transmission 142, a ratio adapter 144, a magnetic coupling 146, a flywheel housing 148, and a flywheel 150. The KERS 102 is drivingly engaged with the second output member 122 of the planetary gearset assembly 106. The components 140, 142, 144, 146, 148, 150 may be disposed in a housing (not shown) or coupled to one another. Further, it is understood that the components 140, 142, 144, 146, 148, 150 may be coupled to one another.

The accessory clutch 140 is a clutching device that may be at least variably engaged. The accessory clutch 140 may be placed in an engaged position, a variably engaged position, and a disengaged position. When placed in the engaged position, the accessory clutch 140 facilitates driving engagement between the second output member 122 and the accessory transmission 142. When placed in the variably engaged position, the accessory clutch 140 transfers a portion of torque from the second output member 122 to the accessory transmission 142 or from the accessory transmission 142 to the second output member 122. When placed in the disengaged position, the second output member 122 is disengaged from the accessory transmission 142.

The accessory transmission 142 is a drive ratio adjusting device that is in driving engagement with a portion of the accessory clutch 140 and a portion of the ratio adapter 144. The accessory transmission 142 may be placed in one of a plurality of drive ratios to facilitate driving engagement between the accessory clutch 140 and the ratio adapter 144. Alternately, it is understood that the accessory transmission 142 may be a drive ratio adjusting device capable of being infinitely varied. As non-limiting examples, the accessory transmission 142 may be an automatic transmission or a continuously variable transmission.

The ratio adapter 144 is a drive ratio adjusting device that is in driving engagement with a portion of the accessory transmission 142 and a portion of the magnetic coupling 146. The ratio adapter 144 is a fixed ratio device which facilitates driving engagement between the accessory transmission 142 and the magnetic coupling 146. As a non-limiting example, the ratio adapter 144 may comprise a planetary gearset or a plurality of planetary gearsets drivingly engaged with one another.

The magnetic coupling 146 is a coupling device that facilitates a transfer of torque from a first portion 152 thereof to a second portion 154 without a mechanical connection, through the flywheel housing 148. As a non-limiting example, each of the first portion 152 and the second portion 154 may be a concentrically arranged permanent magnet array. Further, it is understood that the first portion 152 and the second portion 154 of the magnetic coupling 146 may be arranged to form a drive ratio adjusting device. It is understood that when the first portion 152 and the second portion 154 of the magnetic coupling 146 are arranged to form a drive ratio adjusting device, the KERS 102 may not include the ratio adapter 144.

The flywheel housing 148 is a hollow member which encloses the second portion 154 of the magnetic coupling 146 and the flywheel 150. The flywheel housing 148 may be formed by casting and machining a metal. Alternately, the flywheel housing 148 may be formed from other materials, such as a composite, for example, using other processes. Further, the flywheel housing 148 may be formed from a plurality of components coupled together. The flywheel housing 148 defines a permanently sealed vacuum chamber into which the second portion 154 of the magnetic coupling 146 and the flywheel 150 are rotatably disposed in. The flywheel housing 148 may include at least one flux coupling element forming a portion thereof, the at least one flux coupling element disposed between the first portion 152 and the second portion 154 to increase a flux penetration through the flywheel housing 148. As a non-limiting example, the at least one flux coupling element may be an iron rod, for example.

The flywheel 150 is a disc shaped or cylindrical shaped member. The flywheel 150 is rotatably disposed on an axle (not shown) within the flywheel housing 148. The flywheel 150 is in driving engagement with the second portion 154 of the magnetic coupling 146. A reinforcement band (not shown), which may be formed from a composite material, is disposed on an outer edge of the flywheel 150; however, it is understood that the flywheel 150 may not include the reinforcement band. When the flywheel 150 includes the reinforcement band, it is understood that the reinforcement band may comprise a majority of a mass of the flywheel 150. The flywheel 150 is formed by casting and machining a metal; however, it is understood that other processes and materials, such as forming the flywheel 150 from a composite, may be used. The flywheel 150 is balanced to permit rotation in a high-speed rotational state.

The flywheel 150 is supported in the flywheel housing 148 by at least two bearings (not shown). The bearings are disposed between the flywheel housing 148 and the axle of the flywheel 150, and rotatably support the flywheel 150 within the flywheel housing 148. An outer race of each of the bearings is rigidly coupled to the flywheel housing 148. The bearings capable of supporting the flywheel 150 in the high-speed rotational state are conventional and well known in the art. As non-limiting examples, the bearings may be non-contact bearings, such as a fluid bearing or a magnetic bearing. However, it is understood that the bearings may also be a contact bearing, such as a ceramic bearing or another bearing suitable for operation in a vacuum.

The transmission 108 is a drive ratio adjusting device that is in driving engagement with the first output shaft 120. The transmission 108 may be placed in one of a plurality of drive ratios to facilitate driving engagement between the first output shaft 120 and at least one transmission output 156. Driving engagement between the first output shaft 120 and the at least one transmission output 156 may be facilitated through the use of a primary clutch 158 and a gear arrangement 160. Alternately, it is understood that the transmission 108 may be a drive ratio adjusting device capable of being infinitely varied. As non-limiting examples, the transmission 108 may be an automatic transmission or a continuously variable transmission.

Figure 2:
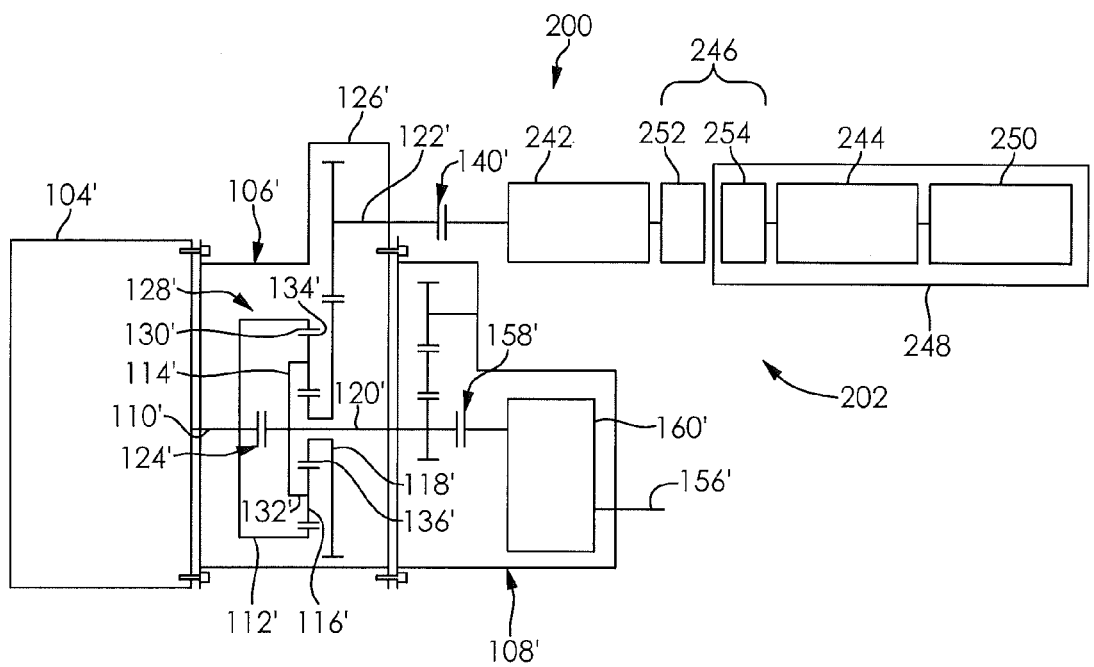
FIG. 2 is a schematic illustration of a driveline including a kinetic energy recovery system according to another embodiment of the present invention.

FIG. 2 illustrates a driveline 200 according to another embodiment of the invention. The embodiment shown in FIG. 2 includes similar components to the vehicle driveline 100 illustrated in FIG. 1. Similar structural features of the driveline 200 include the same reference numeral and a prime (') symbol, with the exception of the features described below.

The driveline 200 is a hybrid driveline and includes a kinetic energy recovery system 202 (henceforth abbreviated as KERS). The driveline 200 includes a power source 104', a planetary gearset assembly 106', the KERS 202, and a transmission 108'. The power source 104' is coupled to and drivingly engaged with the planetary gearset assembly 106'. The planetary gearset assembly 106' is coupled to and drivingly engaged with the transmission 108'. The KERS 202 is drivingly engaged with a portion of the planetary gearset assembly 106'.

The KERS 202 comprises an accessory clutch 140', an accessory transmission 242, a magnetic coupling 246, a flywheel housing 248, a ratio adapter 244, and a flywheel 250. The KERS 202 is drivingly engaged with the second output member 122' of the planetary gearset assembly 106'. The components 140', 242, 244, 246, 248, 250 may be disposed in a housing (not shown) or coupled to one another. Further, it is understood that the components 140', 242, 244, 246, 248, 250 may be coupled to one another.

The accessory clutch 140' is a clutching device that may be at least variably engaged. The accessory clutch 140' may be placed in an engaged position, a variably engaged position, and a disengaged position. When placed in the engaged position, the accessory clutch 140' facilitates driving engagement between the second output member 122' and the accessory transmission 242. When placed in the variably engaged position, the accessory clutch 140' transfers a portion of torque from the second output member 122' to the accessory transmission 242 or from the accessory transmission 242 to the second output member 122'. When placed in the disengaged position, second output member 122' is disengaged from the accessory transmission 242.

The accessory transmission 242 is a drive ratio adjusting device that is in driving engagement with a portion of the accessory clutch 140' and a portion of the magnetic coupling 246. The accessory transmission 242 may be placed in one of a plurality of drive ratios to facilitate driving engagement between the accessory clutch 140' and the magnetic coupling 246. Alternately, it is understood that the accessory transmission 242 may be a drive ratio adjusting device capable of being infinitely varied. As non-limiting examples, the accessory transmission 242 may be an automatic transmission or a continuously variable transmission.

The magnetic coupling 246 is a coupling device that facilitates a transfer of torque from a first portion 252 thereof to a second portion 254 without a mechanical connection, through the flywheel housing 248. As a non-limiting example, each of the first portion 252 and the second portion 254 may be a concentrically arranged permanent magnet array. Further, it is understood that the first portion 252 and the second portion 254 of the magnetic coupling 246 may be arranged to form a drive ratio adjusting device. It is understood that when the first portion 252 and the second portion 254 of the magnetic coupling 246 are arranged to form a drive ratio adjusting device, the KERS 202 may not include the ratio adapter 244.

The flywheel housing 248 is a hollow member which encloses the second portion 254 of the magnetic coupling 246, the ratio adapter 244, and the flywheel 250. The flywheel housing 248 may be formed by casting and machining a metal. Alternately, the flywheel housing 248 may be formed from other materials, such as a composite, for example, using other processes. Further, the flywheel housing 248 may be formed from a plurality of components coupled together. The flywheel housing 248 defines a permanently sealed vacuum chamber into which the second portion 254 of the magnetic coupling 246, the ratio adapter 244, and the flywheel 250 are rotatably disposed in. The flywheel housing 248 may include at least one flux coupling element forming a portion thereof, the at least one flux coupling element disposed between the first portion 252 and the second portion 254 to increase a flux penetration through the flywheel housing 248. As a non-limiting example, the at least one flux coupling element may be an iron rod, for example.

The ratio adapter 244 is a drive ratio adjusting device that is in driving engagement with the second portion 254 of the magnetic coupling 246 and the flywheel 250. The ratio adapter 244 is a fixed ratio device which facilitates driving engagement between the magnetic coupling 146 and the flywheel 250. As a non-limiting example, the ratio adapter 244 may comprise a planetary gearset or a plurality of planetary gearsets drivingly engaged with one another.

The flywheel 250 is a disc shaped or cylindrical shaped member. The flywheel 250 is rotatably disposed on an axle (not shown) within the flywheel housing 248. The flywheel 250 is in driving engagement with the ratio adapter 244. A reinforcement band (not shown), which may be formed from a composite material, is disposed on an outer edge of the flywheel 250; however, it is understood that the flywheel 250 may not include the reinforcement band. When the flywheel 250 includes the reinforcement band, it is understood that the reinforcement band may comprise a majority of a mass of the flywheel 250. The flywheel 250 is formed by casting and machining a metal; however, it is understood that other processes and materials, such as forming the flywheel 250 from a composite, may be used. The flywheel 250 is balanced to permit rotation in a high-speed rotational state.

The flywheel 250 is supported in the flywheel housing 248 by at least two bearings (not shown). The bearings are disposed between the flywheel housing 248 and the axle of the flywheel 250, and rotatably support the flywheel 250 within the flywheel housing 248. An outer race of each of the bearings is rigidly coupled to the flywheel housing 248. The bearings capable of supporting the flywheel 250 in the high-speed rotational state are conventional and well known in the art. As non-limiting examples, the bearings may be non-contact bearings, such as a fluid bearing or a magnetic bearing. However, it is understood that the bearings may also be a contact bearing, such as a ceramic bearing or another bearing suitable for operation in a vacuum.

Figure 3:
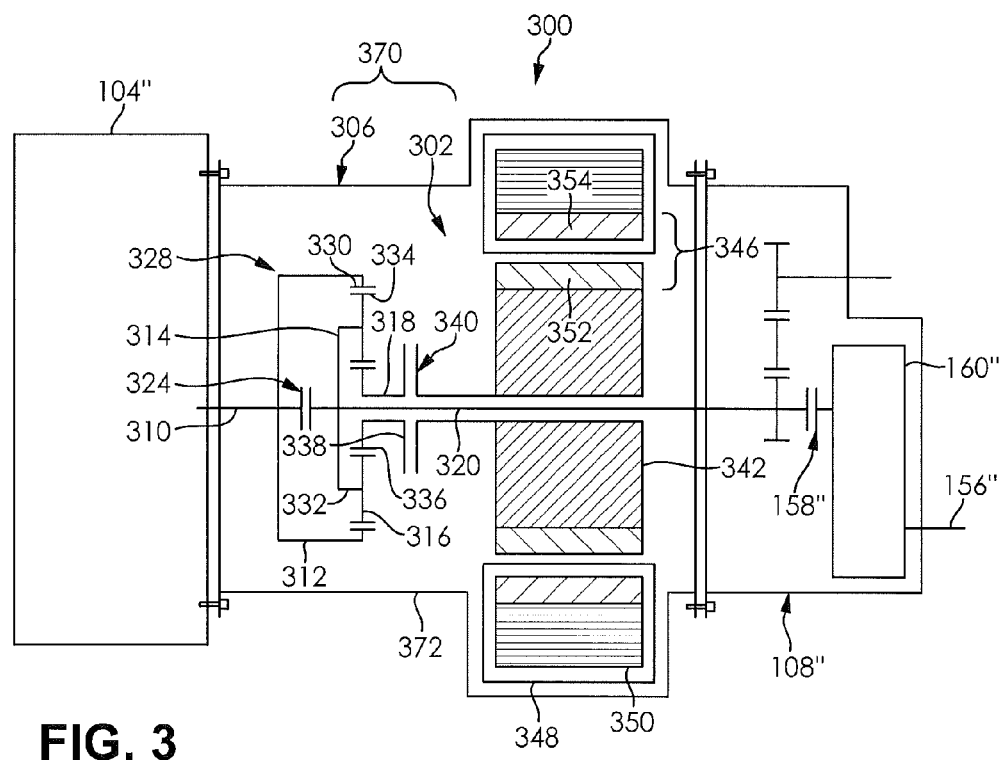
FIG. 3 is a schematic illustration of a driveline including a kinetic energy recovery system according to another embodiment of the present invention.

FIG. 3 illustrates a driveline 300 according to another embodiment of the invention. The embodiment shown in FIG. 3 includes similar components to the vehicle driveline 100 illustrated in FIG. 1. Similar structural features of the driveline 300 include the same reference numeral and a double prime (") symbol, with the exception of the features described below.

The driveline 300 is a hybrid driveline and includes a kinetic energy recovery system 302 (henceforth abbreviated as KERS). The driveline 300 includes a power source 104", a planetary gearset and KERS assembly 370 including a planetary gearset assembly 306 and the KERS 302, and a transmission 108". The power source 104" is coupled to and drivingly engaged with the planetary gearset and KERS assembly 370. The planetary gearset and KERS assembly 370 is coupled to and drivingly engaged with the transmission 108". The KERS 302 is drivingly engaged with a portion of the planetary gearset assembly 306.

The planetary gearset and KERS assembly 370 includes the planetary gearset assembly 306 and the KERS 302 disposed in a housing 372. The housing 372 is a hollow body which may be formed by coupling a plurality of thin walled members to one another. The housing 372 is coupled to the power source 104" and the transmission 108".

The planetary gearset assembly 306 includes an input shaft 310, a ring gear 312, a carrier 314 including a plurality of planet gears 316 disposed thereon, a sun gear 318, an output shaft 320, and a lockout clutch 324. Each of the components 310, 312, 314, 316, 318, 320, 324 is rotatably disposed in the housing 372 and supported by bearings (not shown). The ring gear 312, the carrier 314, the plurality of planet gears 316, and the sun gear 318 form a planetary gearset 328.

The input shaft 310 is an elongate member having a first end drivingly engaged with the power source 104" and a second end drivingly engaged with both the ring gear 312 and a portion of the lockout clutch 324. The input shaft 310 is a rigid shaft formed from a steel; however, it is understood that the input shaft 310 may be formed from other rigid materials and have other shapes. It is understood that the first end and the second end may be drivingly engaged with the power source 104" and the ring gear 312 and a portion of the lockout clutch 324, respectively, in any conventional manner.

The ring gear 312 is an annular member disposed about a portion of the input shaft 310, the lockout clutch 324, the sun gear 318, the plurality of planet gears 316, and a portion of the output shaft 320. A plurality of gear teeth (not shown) is formed on an inner surface 330 of the ring gear 312 for drivingly engaging the plurality of planet gears 316. A plurality of splines (not shown) is formed on the ring gear 312 for engaging a portion of the input shaft 310. Alternately, it is understood that the ring gear 312 may include other features for engaging the input shaft 310 or that the input shaft 310 and the ring gear 312 may be unitarily formed.

The carrier 314 comprises a plurality of planet gear journals 332 in an annular array, onto which the plurality of planet gears 316 is rotatably disposed on. Bearings (not shown) may be disposed between each of the planet gear journals 332 and the planet gears 316 however, it is understood that each of the planet gears 316 may be directly disposed on the planet gear journals 332. A plurality of splines (not shown) is formed on the carrier 314 for engaging a portion of the output shaft 320. Alternately, it is understood that the carrier 314 may include other features for engaging the output shaft 320.

Each of the plurality of planet gears 316 is an annular member rotatably disposed on the planet gear journals 332 of the carrier 314. A plurality of gear teeth (not shown) is formed on an outer surface 334 of each of the plurality of planet gears 316 for drivingly engaging the sun gear 318 and the ring gear 312.

The sun gear 318 is an annular member disposed about a portion of the output shaft 320. A plurality of gear teeth (not shown) is formed on a first outer surface 336 of the sun gear 318 for drivingly engaging the plurality of planet gears 316. A distal end 338 of the sun gear 318 is configured to be in driving engagement with a portion of an accessory clutch 340.

The output shaft 320 is an elongate member having a first end drivingly engaged with the transmission 108" and a second end drivingly engaged with both the carrier 314 and a portion of the lockout clutch 324. The output shaft 320 is a rigid shaft formed from a steel; however, it is understood that the output shaft 320 may be formed from other rigid materials and have other shapes. It is understood that the first end and the second end may be drivingly engaged with the transmission 108" and the carrier 314 and a portion of the lockout clutch 324, respectively, in any conventional manner.

The lockout clutch 324 is a clutching device that may be at least variably engaged. The lockout clutch 324 may be placed in an engaged position, a variably engaged position, and a disengaged position. When placed in the engaged position, the lockout clutch 324 facilitates driving engagement between the input shaft 310 and the output shaft 320, and thus also between the ring gear 312 and the carrier 314, placing the planetary gearset 328 in a "locked out" condition. When placed in the variably engaged position, the lockout clutch 324 transfers a portion of torque from the input shaft 310 to the output shaft 320 by bypassing the planetary gearset 328. When placed in the disengaged position, the input shaft 310 is directly disengaged from the output shaft 320, and all torque from the input shaft 310 is distributed to the carrier 314 and the sun gear 318 (and thus the output shaft 320) by the ring gear 312 according to epicyclic gearing and specific ratios chosen for use with the planetary gearset 328.

The KERS 302 comprises the accessory clutch 340, an accessory transmission 342, a magnetic coupling 346, a flywheel housing 348, and a flywheel 350. The KERS 302 is drivingly engaged with the sun gear 318 of the planetary gearset assembly 306 through the accessory clutch 340. The components 340, 342, 346, 348, 350 are disposed within the housing 372. Further, it is understood that a portion of the components 340, 342, 346, 348, 350 may be coupled to one another.

The accessory clutch 340 is a clutching device that may be at least variably engaged. The accessory clutch 340 may be placed in an engaged position, a variably engaged position, and a disengaged position. When placed in the engaged position, the accessory clutch 340 facilitates driving engagement between the sun gear 318 and the accessory transmission 342. When placed in the variably engaged position, the accessory clutch 340 transfers a portion of torque from the sun gear 318 to the accessory transmission 342 or from the accessory transmission 342 to the sun gear 318. When placed in the disengaged position, the sun gear 318 is disengaged from the accessory transmission 342.

The accessory transmission 342 is a drive ratio adjusting device that is in driving engagement with a portion of the accessory clutch 340. The accessory transmission 342 is disposed about the output shaft 320 and may be placed in one of a plurality of drive ratios to facilitate driving engagement between the accessory clutch 340 and a portion of the magnetic coupler 346. Alternately, it is understood that the accessory transmission 342 may be a drive ratio adjusting device capable of being infinitely varied. As non-limiting examples, the accessory transmission 342 may be an automatic transmission or a continuously variable transmission. Further, it is understood that the accessory transmission 342 may include a ratio adapter (not shown). The ratio adapter is a drive ratio adjusting device that forms a portion of the accessory transmission 342. The ratio adapter is a fixed ratio device which facilitates driving engagement between a portion of the accessory transmission 342 and the magnetic coupling 346. As a non-limiting example, the ratio adapter may comprise a planetary gearset or a plurality of planetary gearsets drivingly engaged with one another.

The magnetic coupling 346 is an annular shaped coupling device that facilitates a transfer of torque from a first portion 352 thereof to a second portion 354 without a mechanical connection, through the flywheel housing 348. As a non-limiting example, each of the first portion 352 and the second portion 354 may be a concentrically arranged permanent magnet array. Further, it is understood that the first portion 352 and the second portion 354 of the magnetic coupling 346 may be arranged to form a drive ratio adjusting device.

The flywheel housing 348 is a hollow, annular shaped member which encloses the second portion 354 of the magnetic coupling 346 and the flywheel 350. The flywheel housing 348 may be formed by casting and machining a metal. Alternately, the flywheel housing 348 may be formed from other materials, such as a composite, for example, using other processes. Further, the flywheel housing 348 may be formed from a plurality of components coupled together. The flywheel housing 348 defines a permanently sealed vacuum chamber into which the second portion 354 of the magnetic coupling 346 and the flywheel 350 are rotatably disposed in. The flywheel housing 348 may include at least one flux coupling element forming a portion thereof, the at least one flux coupling element disposed between the first portion 352 and the second portion 354 to increase a flux penetration through the flywheel housing 348. As a non-limiting example, the at least one flux coupling element may be an iron rod, for example.

The flywheel 350 is a hollow, annular shaped member. The flywheel 350 is rotatably disposed within the flywheel housing 348. The flywheel 350 is in driving engagement with the second portion 354 of the magnetic coupling 346. A reinforcement band (not shown), which may be formed from a composite material, is disposed on an outer edge of the flywheel 350; however, it is understood that the flywheel 350 may not include the reinforcement band. When the flywheel 350 includes the reinforcement band, it is understood that the reinforcement band may comprise a majority of a mass of the flywheel 350. The flywheel 350 is formed by casting and machining a metal; however, it is understood that other processes and materials, such as forming the flywheel 350 from a composite, may be used. The flywheel 350 is balanced to permit rotation in a high-speed rotational state.

The flywheel 350 is supported in the flywheel housing 348 by at least two bearings (not shown). The bearings are disposed between the flywheel housing 348 and the second portion 354 of the magnetic coupling 346, and rotatably support the flywheel 350 within the flywheel housing 348. An inner race of each of the bearings is rigidly coupled to the flywheel housing 348. The bearings capable of supporting the flywheel 350 in the high-speed rotational state are conventional and well known in the art. As non-limiting examples, the bearings may be non-contact bearings, such as a fluid bearing or a magnetic bearing. However, it is understood that the bearings may also be a contact bearing, such as a ceramic bearing or another bearing suitable for operation in a vacuum.

Figure 4:
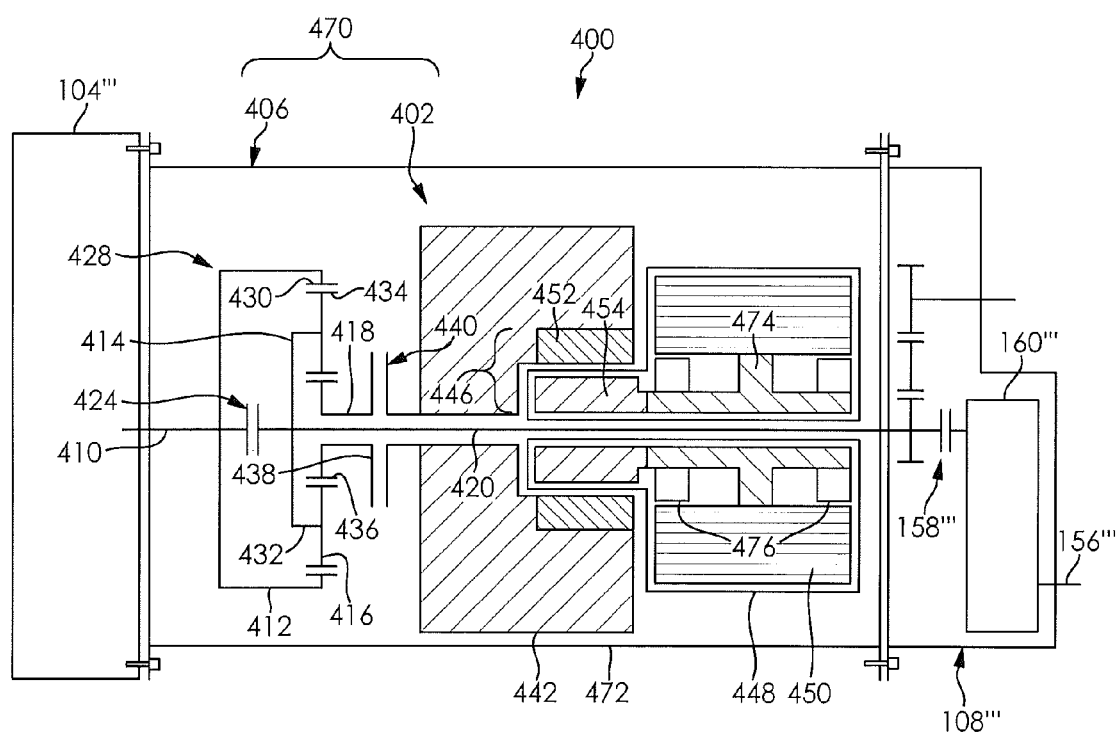
FIG. 4 is a schematic illustration of a driveline including a kinetic energy recovery system according to another embodiment of the present invention.

FIG. 4 illustrates a driveline 400 according to another embodiment of the invention. The embodiment shown in FIG. 4 includes similar components to the vehicle driveline 100 illustrated in FIG. 1. Similar structural features of the driveline 400 include the same reference numeral and a triple prime (''') symbol, with the exception of the features described below.

The driveline 400 is a hybrid driveline and includes a kinetic energy recovery system 402 (henceforth abbreviated as KERS). The driveline 400 includes a power source 104''', a planetary gearset and KERS assembly 470 including a planetary gearset assembly 406 and the KERS 402, and a transmission 108'''. The power source 104''' is coupled to and drivingly engaged with the planetary gearset and KERS assembly 470. The planetary gearset and KERS assembly 470 is coupled to and drivingly engaged with the transmission 108'''. The KERS 402 is drivingly engaged with a portion of the planetary gearset assembly 406.

The planetary gearset and KERS assembly 470 includes the planetary gearset assembly 406 and the KERS 402 disposed in a housing 472. The housing 472 is a hollow body which may be formed by coupling a plurality of thin walled members to one another. The housing 472 is coupled to the power source 104''' and the transmission 108'''.

The planetary gearset assembly 406 includes an input shaft 410, a ring gear 412, a carrier 414 including a plurality of planet gears 416 disposed thereon, a sun gear 418, an output shaft 420, and a lockout clutch 424. Each of the components 410, 412, 414, 416, 418, 420, 424 is rotatably disposed in the housing 472 and supported by bearings (not shown). The ring gear 412, the carrier 414, the plurality of planet gears 416, and the sun gear 418 form a planetary gearset 428.

The input shaft 410 is an elongate member having a first end drivingly engaged with the power source 104''' and a second end drivingly engaged with both the ring gear 412 and a portion of the lockout clutch 424. The input shaft 410 is a rigid shaft formed from a steel; however, it is understood that the input shaft 410 may be formed from other rigid materials and have other shapes. It is understood that the first end and the second end may be drivingly engaged with the power source 104' and the ring gear 412 and a portion of the lockout clutch 424, respectively, in any conventional manner.

The ring gear 412 is an annular member disposed about a portion of the input shaft 410, the lockout clutch 424, the sun gear 418, the plurality of planet gears 416, and a portion of the output shaft 420. A plurality of gear teeth (not shown) is formed on an inner surface 430 of the ring gear 412 for drivingly engaging the plurality of planet gears 416. A plurality of splines (not shown) is formed on the ring gear 412 for engaging a portion of the input shaft 410. Alternately, it is understood that the ring gear 412 may include other features for engaging the input shaft 410 or that the input shaft 410 and the ring gear 412 may be unitarily formed.

The carrier 414 comprises a plurality of planet gear journals 432 in an annular array, onto which the plurality of planet gears 416 is rotatably disposed on. Bearings (not shown) may be disposed between each of the planet gear journals 432 and the planet gears 416 however, it is understood that each of the planet gears 416 may be directly disposed on the planet gear journals 432. A plurality of splines (not shown) is formed on the carrier 414 for engaging a portion of the output shaft 420. Alternately, it is understood that the carrier 414 may include other features for engaging the output shaft 420.

Each of the plurality of planet gears 416 is an annular member rotatably disposed on the planet gear journals 432 of the carrier 414. A plurality of gear teeth (not shown) is formed on an outer surface 434 of each of the plurality of planet gears 416 for drivingly engaging the sun gear 418 and the ring gear 412.

The sun gear 418 is an annular member disposed about a portion of the output shaft 420. A plurality of gear teeth (not shown) is formed on a first outer surface 436 of the sun gear 418 for drivingly engaging the plurality of planet gears 416. A distal end 438 of the sun gear 418 is configured to be in driving engagement with a portion of an accessory clutch 440.

The output shaft 420 is an elongate member having a first end drivingly engaged with the transmission 108''' and a second end drivingly engaged with both the carrier 414 and a portion of the lockout clutch 424. The output shaft 420 is a rigid shaft formed from a steel; however, it is understood that the output shaft 420 may be formed from other rigid materials and have other shapes. It is understood that the first end and the second end may be drivingly engaged with the transmission 108''' and the carrier 414 and a portion of the lockout clutch 424, respectively, in any conventional manner.

The lockout clutch 424 is a clutching device that may be at least variably engaged. The lockout clutch 424 may be placed in an engaged position, a variably engaged position, and a disengaged position. When placed in the engaged position, the lockout clutch 424 facilitates driving engagement between the input shaft 410 and the output shaft 420, and thus also between the ring gear 412 and the carrier 414, placing the planetary gearset 428 in a "locked out" condition. When placed in the variably engaged position, the lockout clutch 424 transfers a portion of torque from the input shaft 410 to the output shaft 420 by bypassing the planetary gearset 428. When placed in the disengaged position, the input shaft 410 is directly disengaged from the output shaft 420, and all torque from the input shaft 410 is distributed to the carrier 414 and the sun gear 418 (and thus the output shaft 420) by the ring gear 412 according to epicyclic gearing and specific ratios chosen for use with the planetary gearset 428.

The KERS 402 comprises the accessory clutch 440, an accessory transmission 442, a magnetic coupling 446, a flywheel housing 448, and a flywheel 450. The KERS 402 is drivingly engaged with the sun gear 418 of the planetary gearset assembly 406 through the accessory clutch 440. The components 440, 442, 446, 448, 450 are disposed within the housing 472. Further, it is understood that a portion of the components 440, 442, 446, 448, 450 may be coupled to one another.

The accessory clutch 440 is a clutching device that may be at least variably engaged. The accessory clutch 440 may be placed in an engaged position, a variably engaged position, and a disengaged position. When placed in the engaged position, the accessory clutch 440 facilitates driving engagement between the sun gear 418 and the accessory transmission 442. When placed in the variably engaged position, the accessory clutch 440 transfers a portion of torque from the sun gear 418 to the accessory transmission 442 or from the accessory transmission 442 to the sun gear 418. When placed in the disengaged position, the sun gear 418 is disengaged from the accessory transmission 442.

The accessory transmission 442 is a drive ratio adjusting device that is in driving engagement with a portion of the accessory clutch 440. The accessory transmission 442 is disposed about the output shaft 420 and may be placed in one of a plurality of drive ratios to facilitate driving engagement between the accessory clutch 440 and a portion of the magnetic coupler 446. Alternately, it is understood that the accessory transmission 442 may be a drive ratio adjusting device capable of being infinitely varied. As non-limiting examples, the accessory transmission 442 may be an automatic transmission or a continuously variable transmission.

The magnetic coupling 446 is an annular shaped coupling device that facilitates a transfer of torque from a first portion 452 thereof to a second portion 454 without a mechanical connection, through the flywheel housing 448. As a non-limiting example, each of the first portion 452 and the second portion 454 may be a concentrically arranged permanent magnet array. The magnetic coupling 446 includes a ratio adapter (not shown). The ratio adapter is a drive ratio adjusting device that forms a portion of the magnetic coupling 446. The ratio adapter is a fixed ratio device which facilitates driving engagement between a portion of the accessory transmission 442 and the magnetic coupling 446. As a non-limiting example, the ratio adapter may comprise a planetary gearset or a plurality of planetary gearsets drivingly engaged with one another.

The flywheel housing 448 is a hollow, stepped, annular shaped member which encloses the second portion 454 of the magnetic coupling 446 and the flywheel 450. A portion of the flywheel housing 448 having a reduced diameter is disposed radially inwardly from the accessory transmission 442 and includes the second portion 454 of the magnetic coupling 446 disposed therein. The flywheel housing 448 may be formed by casting and machining a metal. Alternately, the flywheel housing 448 may be formed from other materials, such as a composite, for example, using other processes. Further, the flywheel housing 448 may be formed from a plurality of components coupled together. The flywheel housing 448 defines a permanently sealed vacuum chamber into which the second portion 454 of the magnetic coupling 446, a flywheel hub 474, and the flywheel 450 are rotatably disposed in. The flywheel housing 448 may include at least one flux coupling element forming a portion thereof, the at least one flux coupling element disposed between the first portion 452 and the second portion 454 to increase a flux penetration through the flywheel housing 448. As a non-limiting example, the at least one flux coupling element may be an iron rod, for example.

The flywheel hub 474 is a hollow, annular shaped member. The flywheel hub 474 is rotatably disposed within the flywheel housing 448. The flywheel hub 474 is in driving engagement with the second portion 454 of the magnetic coupling 446 and the flywheel 450.

The flywheel 450 is a hollow, annular shaped member. The flywheel 450 is rotatably disposed within the flywheel housing 448. The flywheel 450 is in driving engagement with the flywheel hub 474. A reinforcement band (not shown), which may be formed from a composite material, is disposed on an outer edge of the flywheel 450; however, it is understood that the flywheel 450 may not include the reinforcement band. When the flywheel 450 includes the reinforcement band, it is understood that the reinforcement band may comprise a majority of a mass of the flywheel 450. The flywheel 450 is formed by casting and machining a metal; however, it is understood that other processes and materials, such as forming the flywheel 450 from a composite, may be used. The flywheel 450 is balanced to permit rotation in a high-speed rotational state.

The flywheel 450 is supported in the flywheel housing 448 by at least two bearings 476. The bearings 476 are disposed between the flywheel housing 448, the flywheel hub 474, and the flywheel 450 and rotatably support the flywheel 450 within the flywheel housing 448. A race of each of the bearings 476 is rigidly coupled to the flywheel housing 448. The bearings 476 capable of supporting the flywheel 450 in the high-speed rotational state are conventional and well known in the art. As non-limiting examples, the bearings 476 may be non-contact bearings, such as a fluid bearing or a magnetic bearing. However, it is understood that the bearings 476 may also be a contact bearing, such as a ceramic bearing or another bearing suitable for operation in a vacuum.

Figure 5:
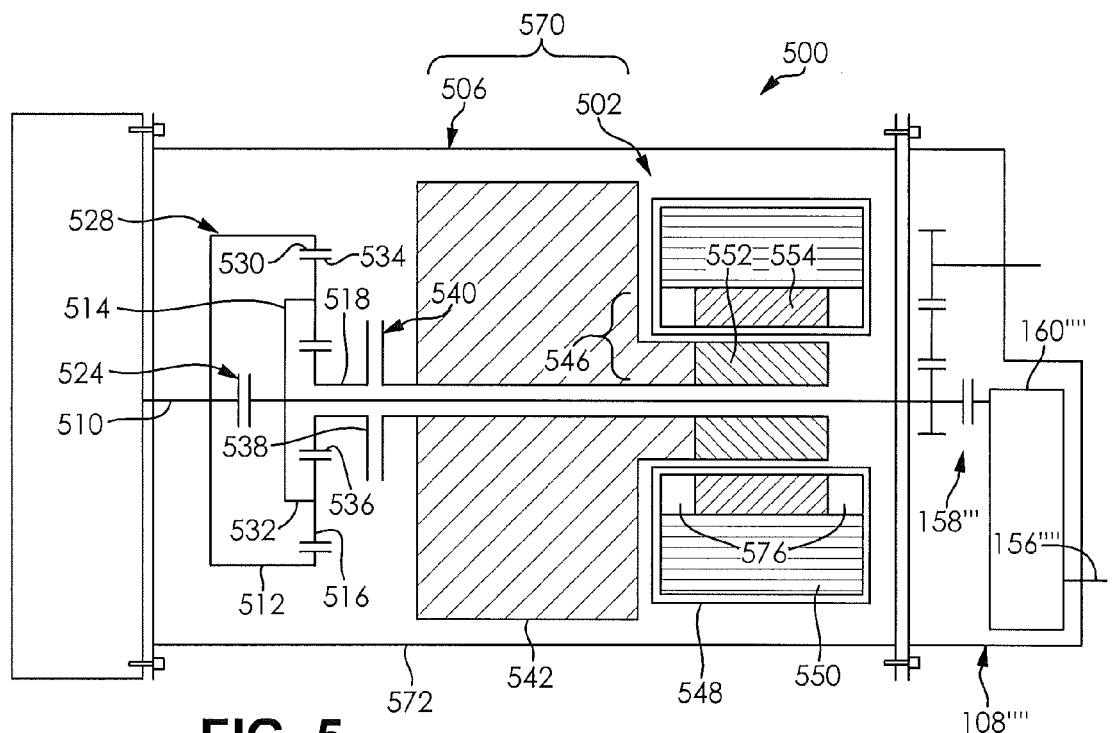
FIG. 5 is a schematic illustration of a driveline including a kinetic energy recovery system according to another embodiment of the present invention.

FIG. 5 illustrates a driveline 500 according to another embodiment of the invention. The embodiment shown in FIG. 5 includes similar components to the vehicle driveline 100 illustrated in FIG. 1. Similar structural features of the driveline 500 include the same reference numeral and a quadruple prime ("'''') symbol, with the exception of the features described below.

The driveline 500 is a hybrid driveline and includes a kinetic energy recovery system 502 (henceforth abbreviated as KERS). The driveline 500 includes a power source 104'''', a planetary gearset and KERS assembly 570 including a planetary gearset assembly 506 and the KERS 502, and a transmission 108''''. The power source 104'''' is coupled to and drivingly engaged with the planetary gearset and KERS assembly 570. The planetary gearset and KERS assembly 570 is coupled to and drivingly engaged with the transmission 108''''. The KERS 502 is drivingly engaged with a portion of the planetary gearset assembly 506.

The planetary gearset and KERS assembly 570 includes the planetary gearset assembly 506 and the KERS 502 disposed in a housing 572. The housing 572 is a hollow body which may be formed by coupling a plurality of thin walled members to one another. The housing 572 is coupled to the power source 104'''' and the transmission 108''''.

The planetary gearset assembly 506 includes an input shaft 510, a ring gear 512, a carrier 514 including a plurality of planet gears 516 disposed thereon, a sun gear 518, an output shaft 520, and a lockout clutch 524. Each of the components 510, 512, 514, 516, 518, 520, 524 is rotatably disposed in the housing 572 and supported by bearings (not shown). The ring gear 512, the carrier 514, the plurality of planet gears 516, and the sun gear 518 form a planetary gearset 528.

The input shaft 510 is an elongate member having a first end drivingly engaged with the power source 104'''' and a second end drivingly engaged with both the ring gear 512 and a portion of the lockout clutch 524. The input shaft 510 is a rigid shaft formed from a steel; however, it is understood that the input shaft 510 may be formed from other rigid materials and have other shapes. It is understood that the first end and the second end may be drivingly engaged with the power source 104'''' and the ring gear 512 and a portion of the lockout clutch 524, respectively, in any conventional manner.

The ring gear 512 is an annular member disposed about a portion of the input shaft 510, the lockout clutch 524, the sun gear 518, the plurality of planet gears 516, and a portion of the output shaft 520. A plurality of gear teeth (not shown) is formed on an inner surface 530 of the ring gear 512 for drivingly engaging the plurality of planet gears 516. A plurality of splines (not shown) is formed on the ring gear 512 for engaging a portion of the input shaft 510. Alternately, it is understood that the ring gear 512 may include other features for engaging the input shaft 510 or that the input shaft 510 and the ring gear 512 may be unitarily formed.

The carrier 514 comprises a plurality of planet gear journals 532 in an annular array, onto which the plurality of planet gears 516 is rotatably disposed on. Bearings (not shown) may be disposed between each of the planet gear journals 532 and the planet gears 516 however, it is understood that each of the planet gears 516 may be directly disposed on the planet gear journals 532. A plurality of splines (not shown) is formed on the carrier 514 for engaging a portion of the output shaft 520. Alternately, it is understood that the carrier 514 may include other features for engaging the output shaft 520.

Each of the plurality of planet gears 516 is an annular member rotatably disposed on the planet gear journals 532 of the carrier 514. A plurality of gear teeth (not shown) is formed on an outer surface 534 of each of the plurality of planet gears 516 for drivingly engaging the sun gear 518 and the ring gear 512.

The sun gear 518 is an annular member disposed about a portion of the output shaft 520. A plurality of gear teeth (not shown) is formed on a first outer surface 536 of the sun gear

518 for drivingly engaging the plurality of planet gears 516. A distal end 538 of the sun gear 518 is configured to be in driving engagement with a portion of an accessory clutch 540.

The output shaft 420 is an elongate member having a first end drivingly engaged with the transmission 108'''' and a second end drivingly engaged with both the carrier 514 and a portion of the lockout clutch 524. The output shaft 520 is a rigid shaft formed from a steel; however, it is understood that the output shaft 520 may be formed from other rigid materials and have other shapes. It is understood that the first end and the second end may be drivingly engaged with the transmission 108''' and the carrier 514 and a portion of the lockout clutch 524, respectively, in any conventional manner.

The lockout clutch 524 is a clutching device that may be at least variably engaged. The lockout clutch 524 may be placed in an engaged position, a variably engaged position, and a disengaged position. When placed in the engaged position, the lockout clutch 524 facilitates driving engagement between the input shaft 510 and the output shaft 520, and thus also between the ring gear 512 and the carrier 514, placing the planetary gearset 528 in a "locked out" condition. When placed in the variably engaged position, the lockout clutch 524 transfers a portion of torque from the input shaft 510 to the output shaft 520 by bypassing the planetary gearset 528. When placed in the disengaged position, the input shaft 510 is directly disengaged from the output shaft 520, and all torque from the input shaft 510 is distributed to the carrier 514 and the sun gear 518 (and thus the output shaft 520) by the ring gear 512 according to epicyclic gearing and specific ratios chosen for use with the planetary gearset 528.

The KERS 502 comprises the accessory clutch 540, an accessory transmission 542, a magnetic coupling 546, a flywheel housing 548, and a flywheel 550. The KERS 502 is drivingly engaged with the sun gear 518 of the planetary gearset assembly 506 through the accessory clutch 540. The components 540, 542, 546, 548, 550 are disposed within the housing 572. Further, it is understood that a portion of the components 540, 542, 546, 548, 550 may be coupled to one another.

The accessory clutch 540 is a clutching device that may be at least variably engaged. The accessory clutch 540 may be placed in an engaged position, a variably engaged position, and a disengaged position. When placed in the engaged position, the accessory clutch 540 facilitates driving engagement between the sun gear 518 and the accessory transmission 542. When placed in the variably engaged position, the accessory clutch 540 transfers a portion of torque from the sun gear 518 to the accessory transmission 542 or from the accessory transmission 542 to the sun gear 518. When placed in the disengaged position, the sun gear 518 is disengaged from the accessory transmission 542.

The accessory transmission 542 is a drive ratio adjusting device that is in driving engagement with a portion of the accessory clutch 540. The accessory transmission 542 is disposed about the output shaft 520 and may be placed in one of a plurality of drive ratios to facilitate driving engagement between the accessory clutch 540 and a portion of the magnetic coupler 546. Alternately, it is understood that the accessory transmission 542 may be a drive ratio adjusting device capable of being infinitely varied. As non-limiting examples, the accessory transmission 542 may be an automatic transmission or a continuously variable transmission.

The magnetic coupling 546 is an annular shaped coupling device that facilitates a transfer of torque from a first portion 552 thereof to a second portion 554 without a mechanical connection, through the flywheel housing 548. As a non-limiting example, each of the first portion 552 and the second portion 554 may be a concentrically arranged permanent magnet array. The magnetic coupling 546 includes a ratio adapter (not shown). The ratio adapter is a drive ratio adjusting device that forms a portion of the magnetic coupling 546. The ratio adapter is a fixed ratio device which facilitates driving engagement between a portion of the accessory transmission 542 and the magnetic coupling 546. As a non-limiting example, the ratio adapter may comprise a planetary gearset or a plurality of planetary gearsets drivingly engaged with one another.

The flywheel housing 548 is a hollow, annular shaped member which encloses the second portion 554 of the magnetic coupling 546 and the flywheel 550. The flywheel housing 548 may be formed by casting and machining a metal. Alternately, the flywheel housing 548 may be formed from other materials, such as a composite, for example, using other processes. Further, the flywheel housing 548 may be formed from a plurality of components coupled together. The flywheel housing 548 defines a permanently sealed vacuum chamber into which the second portion 554 of the magnetic coupling 546 and the flywheel 550 are rotatably disposed in. The flywheel housing 548 may include at least one flux coupling element forming a portion thereof, the at least one flux coupling element disposed between the first portion 552 and the second portion 554 to increase a flux penetration through the flywheel housing 548. As a non-limiting example, the at least one flux coupling element may be an iron rod, for example.

The flywheel 550 is a hollow, annular shaped member. The flywheel 550 is rotatably disposed within the flywheel housing 548. The flywheel 450 is in driving engagement with the second portion 554 of the magnetic coupling 546. A reinforcement band (not shown), which may be formed from a composite material, is disposed on an outer edge of the flywheel 550; however, it is understood that the flywheel 550 may not include the reinforcement band. When the flywheel 550 includes the reinforcement band, it is understood that the reinforcement band may comprise a majority of a mass of the flywheel 550. The flywheel 550 is formed by casting and machining a metal; however, it is understood that other processes and materials, such as forming the flywheel 550 from a composite, may be used. The flywheel 550 is balanced to permit rotation in a high-speed rotational state.

The flywheel 550 is supported in the flywheel housing 548 by at least two bearings 576. The bearings are disposed between the flywheel housing 548, the second portion 554 of the magnetic coupling 546, and the flywheel 550 and rotatably support the flywheel 550 within the flywheel housing 548. A race of each of the bearings is rigidly coupled to the flywheel housing 548. The bearings 576 capable of supporting the flywheel 550 in the high-speed rotational state are conventional and well known in the art. As non-limiting examples, the bearings 576 may be non-contact bearings, such as a fluid bearing or a magnetic bearing. However, it is understood that the bearings 576 may also be a contact bearing, such as a ceramic bearing or another bearing suitable for operation in a vacuum.

Figure 6:
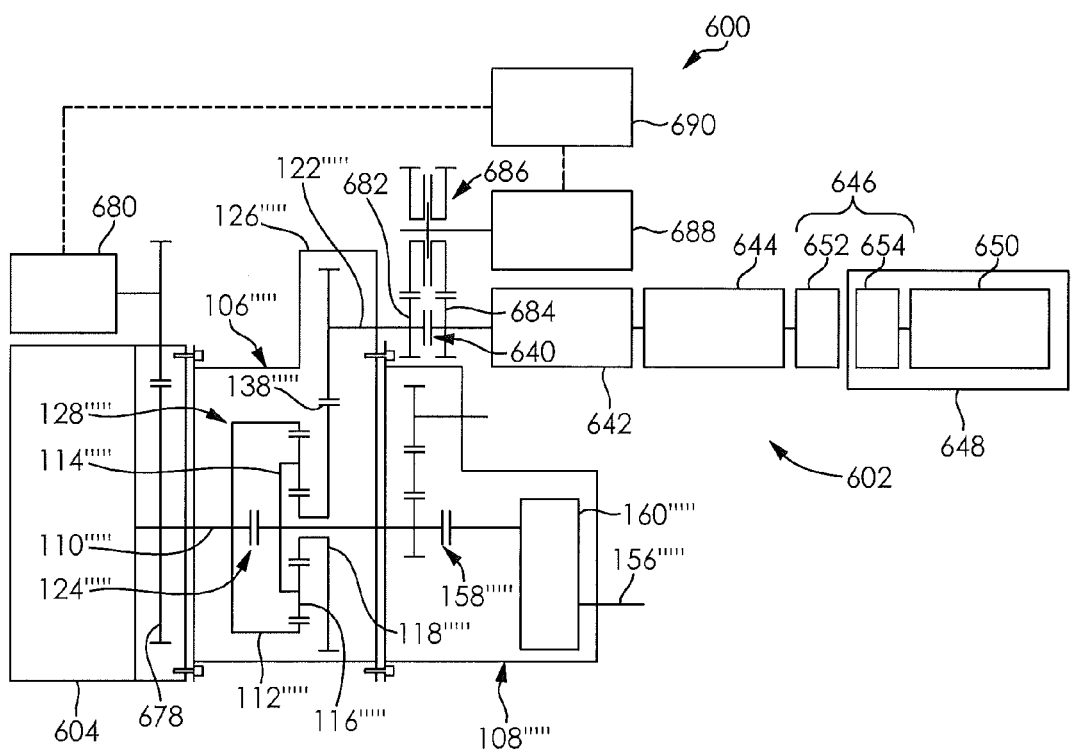
FIG. 6 is a schematic illustration of a driveline including a kinetic energy recovery system according to another embodiment of the present invention.

FIG. 6 illustrates a driveline 600 according to another embodiment of the invention. The embodiment shown in FIG. 6 includes similar components to the vehicle driveline 100 illustrated in FIG. 1. Similar structural features of the driveline 600 include the same reference numeral and a quintuple prime (""''') symbol, with the exception of the features described below.

The driveline 600 is a hybrid driveline and includes a kinetic energy recovery system 602 (henceforth abbreviated as KERS). The driveline 600 includes a power source 604, a planetary gearset assembly 106''''', the KERS 602, and a transmission 108. The power source 604 is coupled to and drivingly engaged with the planetary gearset assembly 106'''''. The planetary gearset assembly 106''''' is coupled to and drivingly engaged with the transmission 108'''''. The KERS 602 is drivingly engaged with a portion of the planetary gearset assembly 106'''''.

The power source 604 is drivingly engaged with an input shaft 110''''' of the planetary gearset assembly 106''''', and applies power thereto. The power source 604 is, for example, an internal combustion engine; however, it is understood that the power source 604 may include an electric motor or another source of rotational output. It is understood that the power source 604 may be a hybrid power source including both an internal combustion engine and an electric motor. Further, it is understood that the power source 604 may include a ratio adjusting device (not shown) as known in the art. Further, it is understood that the power source 604 may include a clutch (not shown) as known in the art, for one of reducing and interrupting a rotational force transferred to the planetary gearset assembly 106'''''. The power source 604 includes an engine flywheel 678 and an engine starter motor 680. The engine flywheel 678 and the engine starter motor 680 conventional components as known in the art and are drivingly engaged with a portion of the power source 604.

The KERS 602 comprises a first gear 682, an accessory clutch 640, a second gear 684, an accessory transmission 642, a ratio adapter 644, a magnetic coupling 646, a flywheel housing 648, a flywheel 650, a two position clutch 686, and an electric motor 688. The KERS 602 is drivingly engaged with the second output member 122''''' of the planetary gearset assembly 106'''''. The components 682, 640, 684, 642, 644, 646, 648, 650 may be disposed in a housing (not shown) or coupled to one another. Further, it is understood that the components 682, 640, 684, 642, 644, 646, 648, 650 may be coupled to one another.

The first gear 682 is a gear disposed on and drivingly engaged with the second output member 122''''' of the planetary gearset assembly 106'''''. The first gear 682 may be splinignly engaged with a portion of the second output member '122''''', for example. An outer surface of the first gear 682 includes a plurality of gear teeth formed thereon and is drivingly engaged with a portion of the two position clutch 686.

The accessory clutch 640 is a clutching device that may be at least variably engaged. The accessory clutch 640 may be placed in an engaged position, a variably engaged position, and a disengaged position. When placed in the engaged position, the accessory clutch 640 facilitates driving engagement between the second output member 122 and the accessory transmission 642. When placed in the variably engaged position, the accessory clutch 640 transfers a portion of torque from the second output member 122''''' to the accessory transmission 642 or from the accessory transmission 642 to the second output member 122'''''. When placed in the disengaged position, the second output member 122''''' is disengaged from the accessory transmission 642.

The second gear 684 is a gear disposed on and drivingly engaged with a portion of the KERS which is drivingly engaged with both a portion of the accessory clutch 640 and the accessory transmission 642. As a non-limiting example, the second gear 684 may be splinignly engaged with a shaft. An outer surface of the second gear 684 includes a plurality of gear teeth formed thereon and is drivingly engaged with a portion of the two position clutch 686.

The accessory transmission 642 is a drive ratio adjusting device that is in driving engagement with a portion of the accessory clutch 640 and a portion of the ratio adapter 644. The accessory transmission 642 may be placed in one of a plurality of drive ratios to facilitate driving engagement between the accessory clutch 640 and the ratio adapter 644. Alternately, it is understood that the accessory transmission 642 may be a drive ratio adjusting device capable of being infinitely varied. As non-limiting examples, the accessory transmission 642 may be an automatic transmission or a continuously variable transmission.

The ratio adapter 644 is a drive ratio adjusting device that is in driving engagement with a portion of the accessory transmission 642 and a portion of the magnetic coupling 646. The ratio adapter 644 is a fixed ratio device which facilitates driving engagement between the accessory transmission 642 and the magnetic coupling 646. As a non-limiting example, the ratio adapter 644 may comprise a planetary gearset or a plurality of planetary gearsets drivingly engaged with one another.

The magnetic coupling 646 is a coupling device that facilitates a transfer of torque from a first portion 652 thereof to a second portion 654 without a mechanical connection, through the flywheel housing 648. As a non-limiting example, each of the first portion 652 and the second portion 654 may be a concentrically arranged permanent magnet array. Further, it is understood that the first portion 652 and the second portion 654 of the magnetic coupling 646 may be arranged to form a drive ratio adjusting device.

The flywheel housing 648 is a hollow member which encloses the second portion 654 of the magnetic coupling 646 and the flywheel 650. The flywheel housing 648 may be formed by casting and machining a metal. Alternately, the flywheel housing 648 may be formed from other materials, such as a composite, for example, using other processes. Further, the flywheel housing 648 may be formed from a plurality of components coupled together. The flywheel housing 648 defines a permanently sealed vacuum chamber into which the second portion 654 of the magnetic coupling 646 and the flywheel 650 are rotatably disposed in. The flywheel housing 648 may include at least one flux coupling element forming a portion thereof, the at least one flux coupling element disposed between the first portion 652 and the second portion 654 to increase a flux penetration through the flywheel housing 648. As a non-limiting example, the at least one flux coupling element may be an iron rod, for example.

The flywheel 650 is a disc shaped or cylindrical shaped member. The flywheel 650 is rotatably disposed on an axle (not shown) within the flywheel housing 648. The flywheel 650 is in driving engagement with the second portion 654 of the magnetic coupling 646. A reinforcement band (not shown), which may be formed from a composite material, is disposed on an outer edge of the flywheel 650; however, it is understood that the flywheel 650 may not include the reinforcement band. When the flywheel 650 includes the reinforcement band, it is understood that the reinforcement band may comprise a majority of a mass of the flywheel 650. The flywheel 650 is formed by casting and machining a metal; however, it is understood that other processes and materials, such as forming the flywheel 650 from a composite, may be used. The flywheel 650 is balanced to permit rotation in a high-speed rotational state.

The flywheel 650 is supported in the flywheel housing 648 by at least two bearings (not shown). The bearings are disposed between the flywheel housing 648 and the axle of the flywheel 650, and rotatably support the flywheel 650 within the flywheel housing 648. An outer race of each of the bearings is rigidly coupled to the flywheel housing 648. The bearings capable of supporting the flywheel 650 in the high-speed rotational state are conventional and well known in the art. As non-limiting examples, the bearings may be non-contact bearings, such as a fluid bearing or a magnetic bearing. However, it is understood that the bearings may also be a contact bearing, such as a ceramic bearing or another bearing suitable for operation in a vacuum.

The two position clutch 686 is a clutching device that may be positioned in one of a first position and a second position. The two position clutch 686 is an interference style clutch, which is commonly referred to as a dog clutch. When the two position clutch 686 is in the first position, the electric motor 688 is in driving engagement with the first gear 682 of the KERS 602, and thus the electric motor 688 is in driving engagement with the sun gear 118'''' of the planetary gearset 128''''. When the two position clutch 686 is in the second position, the electric motor 688 is in driving engagement with the second gear 684 of the KERS 602, and thus the electric motor is in driving engagement with the flywheel 650.

The electric motor 688 is a conventional, electrically operated motor/generator as known in the art, and may be used to generate electrical power in addition to functioning as an electric motor. The electric motor 688 is in driving engagement with a portion of the two position clutch 686. Depending on whether the two position clutch 686 is placed in the first position or the second position, the electric motor 688 is drivingly engaged with one of the first gear 682 and the second gear 684 of the KERS 602. The electric motor 688 is in electric communication with a battery 690. The battery 690 is a battery or a plurality of batteries suitable for use with a vehicle. The battery 690 is also in electric communication with the starter motor 680.

The electric motor 688 may be used instead of a conventional vehicle alternator. When the electric motor 688 is used instead of the conventional vehicle alternator, electrical power may be provided to the battery 690 by the electric motor 688 or electrical power may be supplied by the battery 690 to the electric motor 688.

Further, the electric motor 688 may be used to maintain a minimal operating speed of the flywheel 650 when the vehicle is operating or when the vehicle is not operating. The minimal operating speed of the flywheel 650 may allow the flywheel 650 to be used to start the power source 604 when the vehicle is not operating by engaging the accessory clutch 640. When the flywheel 650 is used to start the power source 604, it is understood that the vehicle may not include a starter motor or may include a starter motor having a reduced torque capacity.

The electric motor 688 may also be used to charge the battery 690 of the vehicle. When the flywheel 650 is operating at a maximum operating speed, excess energy may be transferred to the battery 690 using the electric motor 688, which reduces the rotational speed of the flywheel 650, and allows additional energy to be captured during the braking process by the flywheel 650.

Further, it is understood that the electric motor 688 may be directly drivingly engaged with the power source 604 through the two position clutch 686 and the planetary gearset 128''''. When the electric motor 688 is directly drivingly engaged with the power source 604, the electric motor 688 is similar in function to a vehicle alternator, and may be used to charge the battery 690.

The driveline 600 as shown in FIG. 6 also permits the flywheel 650 to assist the starter motor 680. The starter motor 680 typically included in a vehicle may become overloaded if the driveline 600 incorporates a start-stop mode. To enable the start-stop mode, it is common for a manufacturer of the driveline 600 to increase a size of the starter motor 680 to prevent the starter motor 680 from becoming overloaded. Increasing the size of the starter motor 680 results in an increased cost of the driveline 600. The flywheel 650 may be used to assist the starter motor 680 by variably engaging the accessory clutch 640, which allows the driveline 600 to include a conventional starter motor.

Further, it is understood that the driveline 600 may include a continuously variable transmission in place of the accessory transmission 642 and the accessory clutch 640. Use of the continuously variable transmission in the driveline 600 reduces losses that may occur through use of the accessory clutch 640. Inclusion of the continuously variable transmission in the driveline 100, 200, 300, 400, 500, 600 facilitates finer gearing ratios to be provided to each of the aforementioned embodiments of the driveline 100, 200, 300, 400, 500, 600.

Figure 7:
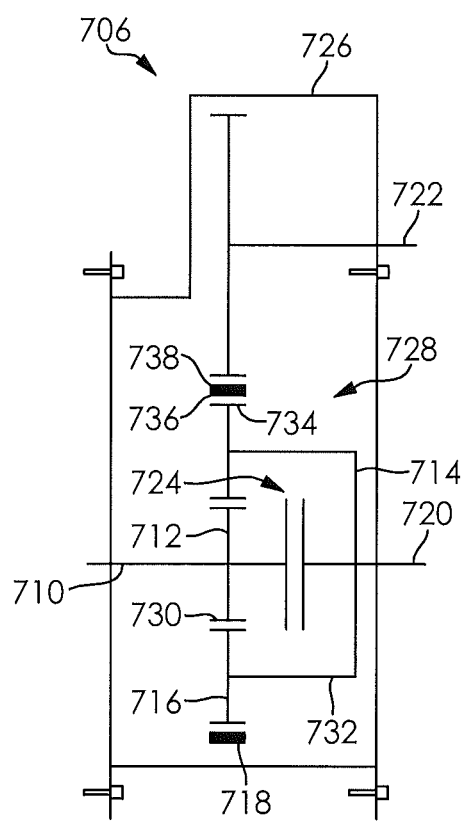
FIG. 7 is a schematic illustration of a planetary gearset assembly of a driveline according to another embodiment of the present invention.

FIG. 7 illustrates a planetary gearset assembly 706 according to another embodiment of the invention. It is understood that the planetary gearset assembly 706 may be used in place of the planetary gearset assembly 106, 106', 106'''' of the driveline 100, 200, 600. Further, it is understood that the planetary gearset assembly 706 as illustrated in FIG. 7 may be adapted for use with the planetary gearset assembly 306, 406, 506 of the driveline 300, 400, 500.

The planetary gearset assembly 706 includes an input shaft 710, a sun gear 712, a carrier 714 including a plurality of planet gears 716 disposed thereon, a ring gear 718, a first output shaft 720, a second output member 722, and a lockout clutch 724. Each of the components 710, 712, 714, 716, 718, 720, 722, 724 is rotatably disposed in a housing 726 and supported by bearings (not shown). The sun gear 712, the carrier 714, the plurality of planet gears 716, and the ring gear 718 form a planetary gearset 728. The housing 726 is a hollow body which may be formed by coupling a plurality of thin walled members to one another.

The input shaft 710 is an elongate member having a first end which may be drivingly engaged with the power source 104, 104', 104'', 104''', 104'''', 604 and a second end drivingly engaged with both the sun gear 712 and a portion of the lockout clutch 724. The input shaft 710 is a rigid shaft formed from a steel; however, it is understood that the input shaft 710 may be formed from other rigid materials and have other shapes. It is understood that the first end and the second end may be drivingly engaged with the power source 104, 104', 104'', 104''', 104'''', 604 and the sun gear 712 and a portion of the lockout clutch 724, respectively, in any conventional manner.

The sun gear 712 is an annular member disposed about a portion of the input shaft 710. A plurality of gear teeth (not shown) is formed on a first outer surface 730 of the sun gear 712 for drivingly engaging the plurality of planet gears 716.

The carrier 714 comprises a plurality of planet gear journals 732 in an annular array, onto which the plurality of planet gears 716 is rotatably disposed on. Bearings (not shown) may be disposed between each of the planet gear journals 732 and the planet gears 716 however, it is understood that each of the planet gears 716 may be directly disposed on the planet gear journals 732. A plurality of splines (not shown) is formed on the carrier 714 for engaging a portion of the first output shaft 720. Alternately, it is understood that the carrier 714 may include other features for engaging the first output shaft 720.

Each of the plurality of planet gears 716 is an annular member rotatably disposed on the planet gear journals 732 of the carrier 714. A plurality of gear teeth (not shown) is formed on an outer surface 734 of each of the plurality of planet gears 716 for drivingly engaging the sun gear 712 and the ring gear 718.

The ring gear 718 is an annular member disposed about a portion of the input shaft 710, the lockout clutch 724, the sun gear 712, the plurality of planet gears 716, and a portion of the first output shaft 720. A plurality of gear teeth (not shown) is formed on an inner surface 736 of the ring gear 718 for drivingly engaging the plurality of planet gears 716. A plurality of gear teeth (not shown) is also formed on an outer surface 738 of the ring gear 718 for drivingly engaging the second output member 722.

The first output shaft 720 is an elongate member having a first end which may be drivingly engaged with the transmission 108, 108', 108'', 108''', 108'''', 108''''' and a second end drivingly engaged with both the carrier 714 and a portion of the lockout clutch 724. The first output shaft 720 is a rigid shaft formed from a steel; however, it is understood that the first output shaft 720 may be formed from other rigid materials and have other shapes. It is understood that the first end and the second end may be drivingly engaged with the transmission 108, 108', 108'', 108''', 108'''', 108''''' and the carrier 714 and a portion of the lockout clutch 724, respectively, in any conventional manner.

The second output member 722 is an elongate member having a first end drivingly engaged with the ring gear 718 and a second end drivingly engaged with a portion of the KERS 102, 202, 302, 402, 502, 602. The second output member 722 is a rigid shaft formed from a steel; however, it is understood that the second output member 722 may be formed from other rigid materials and have other shapes. The first end of the second output member 722 is drivingly engaged with the ring gear 718 through a plurality of gear teeth (not shown); however, it is understood that the first end of the second output member 722 may be drivingly engaged with the ring gear 718 in any conventional manner. The second end of the second output member 722 may be drivingly engaged with the portion of the KERS 102, 202, 302, 402, 502, 602 in any conventional manner.

The lockout clutch 724 is a clutching device that may be at least variably engaged. The lockout clutch 724 may be placed in an engaged position, a variably engaged position, and a disengaged position. When placed in the engaged position, the lockout clutch 724 facilitates driving engagement between the input shaft 710 and the first output shaft 720, and thus also between the sun gear 712 and the carrier 714, placing the planetary gearset 728 in a "locked out" condition. When placed in the variably engaged position, the lockout clutch 724 transfers a portion of torque from the input shaft 710 to the first output shaft 720 by bypassing the planetary gearset 728. When placed in the disengaged position, the input shaft 710 is directly disengaged from the first output shaft 720, and all torque from the input shaft 710 is distributed to the carrier 714 and the ring gear 718 (and thus the first output shaft 720 and the second output member 722, respectively) by the sun gear 712 according to epicyclic gearing and specific ratios chosen for use with the planetary gearset 728.

In use, the driveline 100, 200, 300, 400, 500, 600 permits braking energy to be recovered and stored in the flywheel 150, 250, 350, 450, 550, 650, among other advantages. Recuperation of the braking energy provides many benefits to the driveline 100, 200, 300, 400, 500, 600 compared to conventional vehicle drivelines. The planetary gearset 128, 128', 328, 428, 528, 128''''', 728 facilitates control of components engaged with the planetary gearset 128, 128', 328, 428, 528, 128''''', 728, and thus the power flow within the driveline 100, 200, 300, 400, 500, 600 in a more optimal manner. The driveline 100, 200, 300, 400, 500, 600 improves fuel economy of a vehicle the driveline 100, 200, 300, 400, 500, 600 is incorporated in, permits a size of the power source 104, 104', 104'', 104''', 104'''', 604 to be reduced, reduces emissions of the vehicle the driveline 100, 200, 300, 400, 500, 600 is incorporated in, increases a brake life of the vehicle the driveline 100, 200, 300, 400, 500, 600 is incorporated in, and reduces maintenance costs associated with the vehicle the driveline 100, 200, 300, 400, 500, 600 is incorporated in.

The driveline 100, 200, 300, 400, 500, 600 includes the flywheel 150, 250, 350, 450, 550, 650, which is a composite flywheel typically comprising a steel hub having a composite rim disposed thereon. The composite rim may be formed from carbon fiber, Kevlar, or other similar materials capable of reinforcing the steel hub at operational speeds. The operational speeds may be from about 30,000 revolutions per minute to about 60,000 revolutions per minute. Such high speeds are particularly important as an amount of energy stored in the flywheel 150, 250, 350, 450, 550, 650 is directly proportional to a rotational speed to the second power. The following equation may be used to calculate the amount of energy stored in the flywheel 150, 250, 350, 450, 550, 650:

$$E_{kinetic} = \frac{1}{2}I\omega^2$$

where "I" is the inertia of the flywheel 150, 250, 350, 450, 550, 650 and can be expressed as:

$$I = \frac{1}{2}m(Radius_{ext}^2 - Radius_{int}^2)$$

in which "m" is a mass of the flywheel 150, 250, 350, 450, 550, 650 and "Radius" is a radius of the flywheel 150, 250, 350, 450, 550, 650. The kinetic energy of the flywheel 150, 250, 350, 450, 550, 650 can be expressed as:

$$E_{kinetic} = \frac{1}{4}m(Radius_{ext}^2 - Radius_{int}^2)\omega^2$$

The flywheel 150, 250, 350, 450, 550, 650 having a composite structure allows the flywheel 150, 250, 350, 450, 550, 650 to rotate at a faster speed when compared to flywheels formed from traditional materials, such as steel, for the same radius. The flywheel 150, 250, 350, 450, 550, 650 can therefore store as much energy as the flywheel formed from traditional materials, but while having a lower weight and a smaller radius. Further, by reducing the weight and the radius of the flywheel 150, 250, 350, 450, 550, 650, a gyroscopic effect generated by the flywheel is reduced.

The flywheel 150, 250, 350, 450, 550, 650 is placed into the flywheel housing 148, 248, 348, 448, 548, 648, on which a vacuum is drawn, to avoid energy losses caused by air resistance. The flywheel housing 148, 248, 348, 448, 548, 648 is also designed to contain the flywheel 150, 250, 350, 450, 550, 650 and dissipate the energy stored in the flywheel 150, 250, 350, 450, 550, 650 in the event of a major failure.

As a result of using the magnetic coupling 146, 246, 346, 446, 546, 646 instead of a shaft and seal combination passing through the flywheel housing 148, 248, 348, 448, 548, 648, the flywheel housing 148, 248, 348, 448, 548, 648 may be sealed for an expected operating life, avoiding any losses which may be incurred by rotating seals. Consequently, neither a vacuum pump nor a vacuum controller is needed, which reduces the number of components, the cost, and the energy consumption of the driveline 100, 200, 300, 400, 500, 60.

The driveline 100, 200, 300, 400, 500, 600 including the KERS 102, 202, 302, 402, 502, 602 can be used in a wide variety of applications. As non-limiting examples, the driveline 100, 200, 300, 400, 500, 600 may be incorporated into passenger vehicles, transit buses, commercial vehicles (such as delivery trucks, utility vehicles, vocational trucks, and collection trucks), and off-highway vehicles. The benefits of the driveline 100, 200, 300, 400, 500, 600 correlate to a driving cycle and a duty cycle of the vehicle. However, applications requiring frequent stop andgo cycles requiring increased power demands are well suited for the driveline 100, 200, 300, 400, 500, 600 including the KERS 102, 202, 302, 402, 502, 602.

The operation of the driveline 100, 200, 300, 400, 500, 600 including the KERS 102, 202, 302, 402, 502, 602 may be explained by describing each of the modes of operation the driveline 100, 200, 300, 400, 500, 600 may be operated in. The driveline 100, 200, 300, 400, 500, 600 may be operated in three modes of operation; a braking mode, an active planetary acceleration mode, and a locked planetary acceleration mode. The active planetary acceleration mode is distinguished from the locked planetary acceleration mode depending on an engagement of the lockout clutch 124, 124', 324, 424, 524, 124''''', 724.

The objective of the braking mode is to store as much kinetic energy of the vehicle including the driveline 100, 200, 300, 400, 500, 600 as possible in the flywheel 150, 250, 350, 450, 550, 650. Wheels (not shown), which are drivingly engaged with the driveline 100, 200, 300, 400, 500, 600, are used to direct the kinetic energy of the vehicle into the flywheel 150, 250, 350, 450, 550, 650. By engaging the lockout clutch 124, 124', 324, 424, 524, 124''''', 724, the planetary gearset 128, 128', 328, 428, 528, 128''''', 728 is placed in a locked condition. In the locked condition, the components of each of the planetary gearsets 128, 128', 328, 428, 528, 128''''', 728 rotate at the same speed. By variably engaging the accessory clutch 140, 140', 340, 440, 540, 640, torque distribution between the wheels and the KERS 102, 202, 302, 402, 502, 602 may be controlled. A rotational speed of the carrier 114, 114', 314, 414, 514, 114''''', 714 is adjusted to a low value (to reduce losses caused by engine braking) by selecting an appropriate gear of the accessory transmission 142, 242, 342, 442, 542, 642 and by adjusting an oil pressure (which engages the accessory clutch 140, 140', 340, 440, 540, 640), power is stored in the flywheel 150, 250, 350, 450, 550, 650 (which is driven through the sun gear 118, 118', 318, 418, 518, 118''''' or the ring gear 718). Such a process increases a rotational speed of the flywheel 150, 250, 350, 450, 550, 650, and thus the amount of energy stored therein. Additionally, by variably engaging the lockout clutch 124, 124', 324, 424, 524, 124''''', 724, torque can also be applied to the power source 104, 104', 104'', 104''', 104'''', 604 based on an engine braking torque curve, which is predefined.

Figure 8:
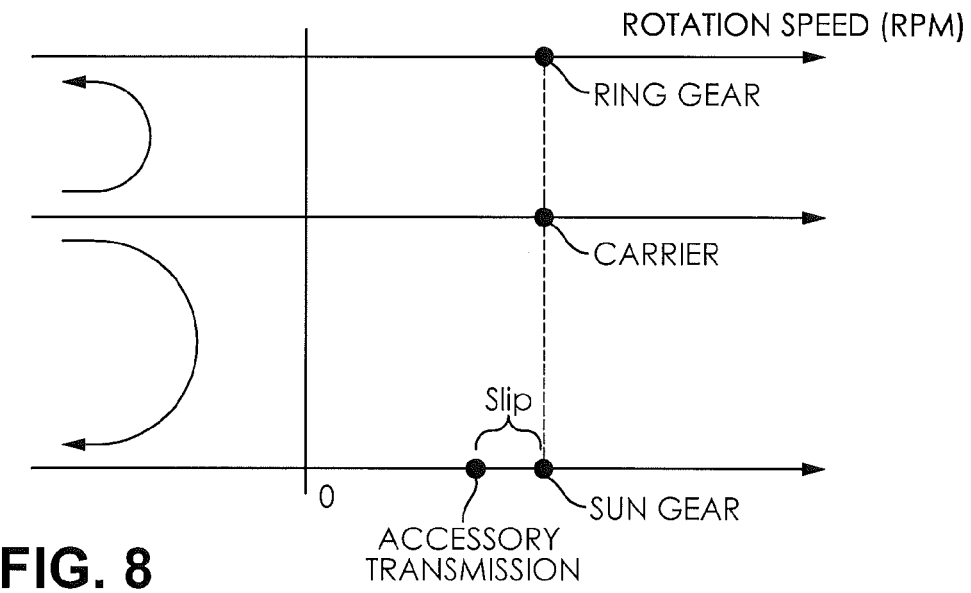
FIG. 8 is a speed diagram which illustrates a speed of a plurality of components of a planetary gearset forming a portion of the vehicle driveline of the embodiments of the invention shown in FIGS. 1-6, the speed of the plurality of components shown during a braking mode.

FIG. 8 is a speed diagram which illustrates a speed (indicated by the dashed vertical line) of each of the ring gear 112, 112', 312, 412, 512, 112''''', 718, the carrier 114, 114', 314, 414, 514, 114''''', 714, and the sun gear 118, 118', 318, 418, 518, 118''''', 712 during the braking mode. It is understood that the diagrams of FIGS. 8-13 do not apply to the embodiment of the planetary gearset assembly 706 shown in FIG. 7; however, it is also understood that the diagrams of FIGS. 8-13 illustrate similar principles which apply to the planetary gearset assembly 706 shown in FIG. 7.

As shown in FIG. 8, when the planetary gearset 128, 128', 328, 428, 528, 128''''' is placed in the locked condition, the rotational speed of the carrier 114, 114', 314, 414, 514, 114''''' (which is drivingly engaged with the transmission 108, 108', 108'', 108''', 108'''', 108'''''), the ring gear 112, 112', 312, 412, 512, 112''''' (which is drivingly engaged with the power source 104, 104', 104'', 104''', 104'''', 604), and the sun gear 118, 118', 318, 418, 518, 118''''' (which is drivingly engaged with the KERS 102, 202, 302, 402, 502, 602) are equal, and is illustrated as such (by the dashed vertical line passing through each horizontal axis). The rotational speed of the carrier 114, 114', 314, 414, 514, 114''''' (as well as the rotational speed of the ring gear 112, 112', 312, 412, 512, 112''''' and the sun gear 118, 118', 318, 418, 518, 118''''') is equal to a rotational speed of the wheels multiplied by the ratio of a selected gear of the transmission 108, 108', 108'', 108''', 108'''', 108'''''.

A point shown in FIG. 8 on the horizontal axis indicating the speed of the sun gear 118, 118', 318, 418, 518, 118''''' represents a rotational speed of an input of the accessory transmission 142, 242, 342, 442, 542, 642 prior to initiation of the braking mode. The rotational speed of the input of the accessory transmission 142, 242, 342, 442, 542, 642 is determined by the speed of the flywheel 150, 250, 350, 450, 550, 650 and a gear ratio of a gear selected within the accessory transmission 142, 242, 342, 442, 542, 642. The gear selected within the accessory transmission 142, 242, 342, 442, 542, 642 is chosen to minimize losses that may occur during the braking mode through engine braking and excessive slipping of the accessory clutch 140, 140', 340, 440, 540, 640. The braking mode is initiated by engaging the accessory clutch 140, 140', 340, 440, 540, 640, which increases the rotational speed of the accessory transmission 142, 242, 342, 442, 542, 642 (and thus the flywheel 150, 250, 350, 450, 550, 650) by transferring power from the planetary gearset 128, 128', 328, 428, 528, 128''''' to the accessory transmission 142, 242, 342, 442, 542, 642 through the accessory clutch 140, 140', 340, 440, 540, 640. Based on a speed of the flywheel 150, 250, 350, 450, 550, 650, the selected gear of the accessory transmission 142, 242, 342, 442, 542, 642 will be adjusted to further increase the rotational speed of the flywheel 150, 250, 350, 450, 550, 650 until a maximum speed is reached. Because the aforementioned steps occur during the braking process, at some point, the rotational speed of the planetary gearset 128, 128', 328, 428, 528, 128''''' will be too low to permit engagement to occur between the planetary gearset 128, 128', 328, 428, 528, 128''''' and the transmission 108, 108', 108'', 108''', 108'''', 108'''''. When the rotational speed of the planetary gearset 128, 128', 328, 428, 528, 128''''' becomes too low to permit engagement to occur between the planetary gearset 128, 128', 328, 428, 528, 128''''' and the transmission 108,

108', 108", 108''', 108'''', 108''''', the primary clutch 158, 158', 158", 158''', 158'''', 158''''' in the transmission 108, 108', 108", 108''', 108'''', 108''''' is released and further braking of the vehicle is performed by conventional vehicle brakes.

In the active planetary acceleration mode, the lockout clutch 124, 124', 324, 424, 524, 124''''' is disengaged. The planetary gearset 128, 128', 328, 428, 528, 128''''' allows the power source 104, 104', 104", 104''', 104'''', 604 to be operated at a desired speed. The desired speed may be selected to increase a performance or a fuel efficiency of the vehicle. Further, it is understood that the gear ratios of the accessory transmission 142, 242, 342, 442, 542, 642 and the transmission 108, 108', 108", 108''', 108'''', 108''''' may be selected based on a preferred operating speed of the vehicle or an amount of power the flywheel 150, 250, 350, 450, 550, 650 is capable of delivering to the driveline 100, 200, 300, 400, 500, 600. The planetary gearset 128, 128', 328, 428, 528, 128''''' facilitates optimized power delivery from either the power source 104, 104', 104", 104''', 104'''', 604 or the flywheel 150, 250, 350, 450, 550, 650, and the accessory transmission 142, 242, 342, 442, 542, 642 and the transmission 108, 108', 108", 108''', 108'''', 108''''' facilitate power delivery at a variety of speeds of the flywheel 150, 250, 350, 450, 550, 650 and the driveline 100, 200, 300, 400, 500, 600.

Figure 9:
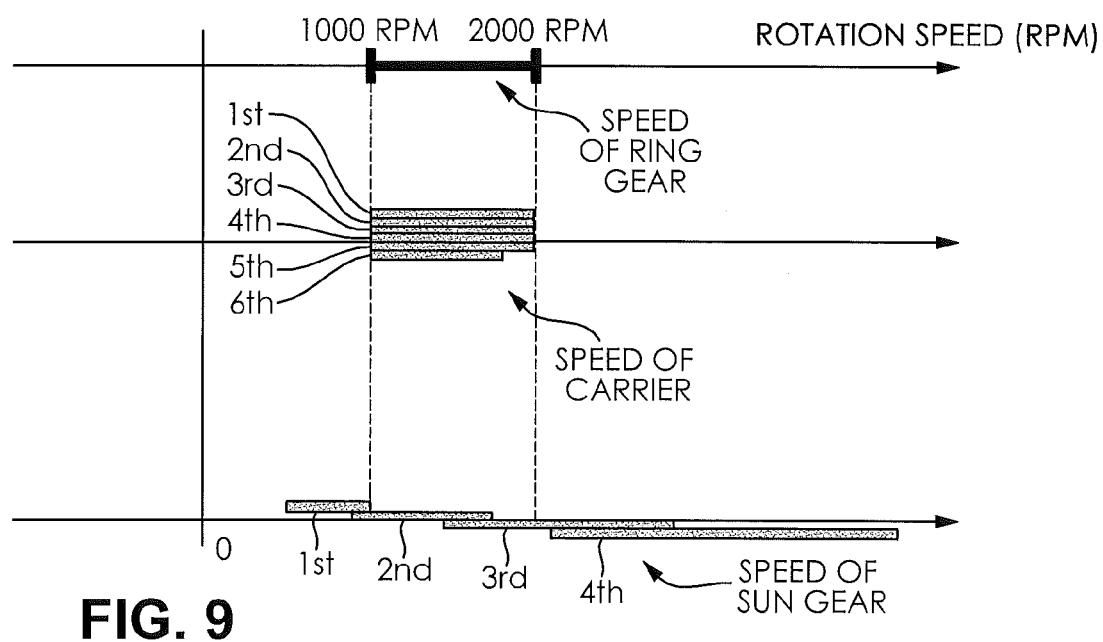
FIG. 9 is a speed diagram which illustrates a speed of a plurality of components of a planetary gearset forming a portion of the vehicle driveline of the embodiments of the invention shown in FIGS. 1-6, the speed of the plurality of components shown during an active planetary acceleration mode.

FIG. 9 is a speed diagram which illustrates a rotational speed of each of the ring gear 112, 112', 312, 412, 512, 112''''', the carrier 114, 114', 314, 414, 514, 114''''', and the sun gear 118, 118', 318, 418, 518, 118''''' during the active planetary acceleration mode as horizontal axes. As a non-limiting example, a speed zone of about 1,000 revolutions per minute to about 2,000 revolutions per minute is shown in FIG. 9 as representing a range of a rotational speed of the power source 104, 104', 104", 104''', 104'''', 604, which corresponds to a rotational speed of the ring gear 112, 112', 312, 412, 512, 112'''''.

A rotational speed of the carrier 114, 114', 314, 414, 514, 114''''' is also shown in FIG. 9, and corresponds to a rotational speed of an input of the transmission 108, 108', 108", 108''', 108'''', 108'''''. FIG. 9 illustrates six bars, labeled $1^{st}$ through $6^{th}$, adjacent the horizontal axis which illustrates the rotational speed of the carrier 114, 114', 314, 414, 514, 114'''''. The bars represent the speed of the input of the transmission 108, 108', 108", 108''', 108'''', 108''''' for each gear ratio of the transmission 108, 108', 108", 108''', 108'''', 108'''''. The $1^{st}$ to the $5^{th}$ gear are limited to the rotational speeds achievable by the power source 104, 104', 104", 104''', 104'''', 604, while a limitation for the $6^{th}$ gear is linked to a maximum speed of the vehicle. The exemplary speed limitations illustrated are similar to the speed limitations present when the transmission 108, 108', 108", 108''', 108'''', 108''''' is directly connected to the power source 104, 104', 104", 104', 104'''', 604. The inclusion of the planetary gearset 128, 128', 328, 428, 528, 128''''' in the driveline 100, 200, 300, 400, 500, 600 enables a higher achievable speed for the carrier 114, 114', 314, 414, 514, 114''''', as the carrier 114, 114', 314, 414, 514, 114''''' may be simultaneously driven by the sun gear 118, 118', 318, 418, 518, 118'''''. For a given gear of the transmission 108, 108', 108", 108''', 108'''', 108''''' and an operating speed range of the power source 104, 104', 104", 104', 104'''', 604, the rotational speeds of the carrier 114, 114', 314, 414, 514, 114''''' and the sun gear 118, 118', 318, 418, 518, 118''''' are limited to ranges defined by the planetary gearset 128, 128', 328, 428, 528, 128'''''.

A rotational speed of the sun gear 118, 118', 318, 418, 518, 118''''' is also shown in FIG. 9, and corresponds to a rotational speed of an input of the accessory transmission 142, 242, 342, 442, 542, 642. FIG. 9 illustrates four bars, labeled $1^{st}$ through $4^{th}$, adjacent the horizontal axis which illustrates the rotational speed of the sun gear 118, 118', 318, 418, 518, 118'''''. The bars represent the speed of the sun gear 118, 118', 318, 418, 518, 118''''' for each gear ratio of the accessory transmission 142, 242, 342, 442, 542, 642. The operating speed range of the flywheel 150, 250, 350, 450, 550, 650 may be about 30,000 revolutions per minute to about 60,000 revolutions per minute. A given speed of the flywheel 150, 250, 350, 450, 550, 650 is divided by a given ratio of the ratio adapter 144, 244, 644, the selected ratio of the accessory transmission 142, 242, 342, 442, 542, 642 (as a non-limiting example, a 4-speed gearbox is illustrated to indicate the four speed ranges available), and any additional ratio adjusting devices present.

For a given flywheel speed within the operating range, one of the speeds of the accessory transmission 142, 242, 342, 442, 542, 642 is able to accommodate the rotational speed of the carrier 114, 114', 314, 414, 514, 114''''' by merely varying the speed of the power source 104, 104', 104", 104''', 104'''', 604. The selection of the gear ratios of the accessory transmission 142, 242, 342, 442, 542, 642, the ratio of the ratio adapter 144, 244, 644, the ratios of the planetary gearset 128, 128', 328, 428, 528, 128''''', and the ratios of any additional ratio adjusting devices present are selected to ensure that the power source 104, 104', 104", 104''', 104'''', 604 may be drivingly engaged with the flywheel 150, 250, 350, 450, 550, 650 through the planetary gearset 128, 128', 328, 428, 528, 128'''''.

Figure 10:
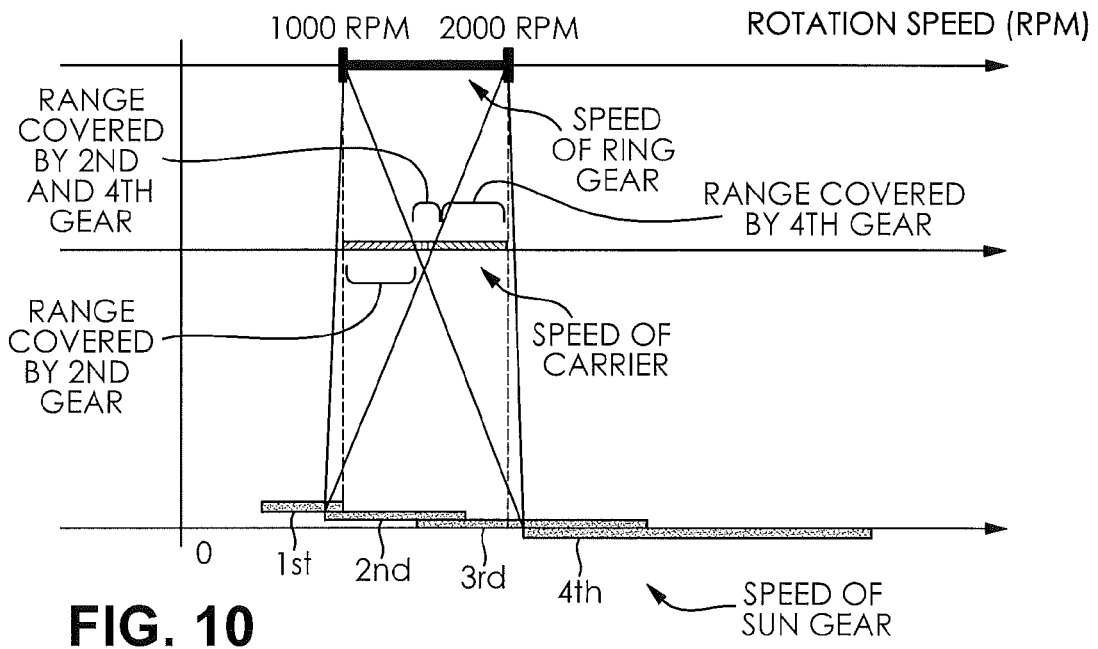
FIG. 10 is a speed diagram which illustrates an exemplary gear ratio spread of a plurality of components of a planetary gearset forming a portion of the vehicle driveline of the embodiments of the invention shown in FIGS. 1-6.
Figure 11:
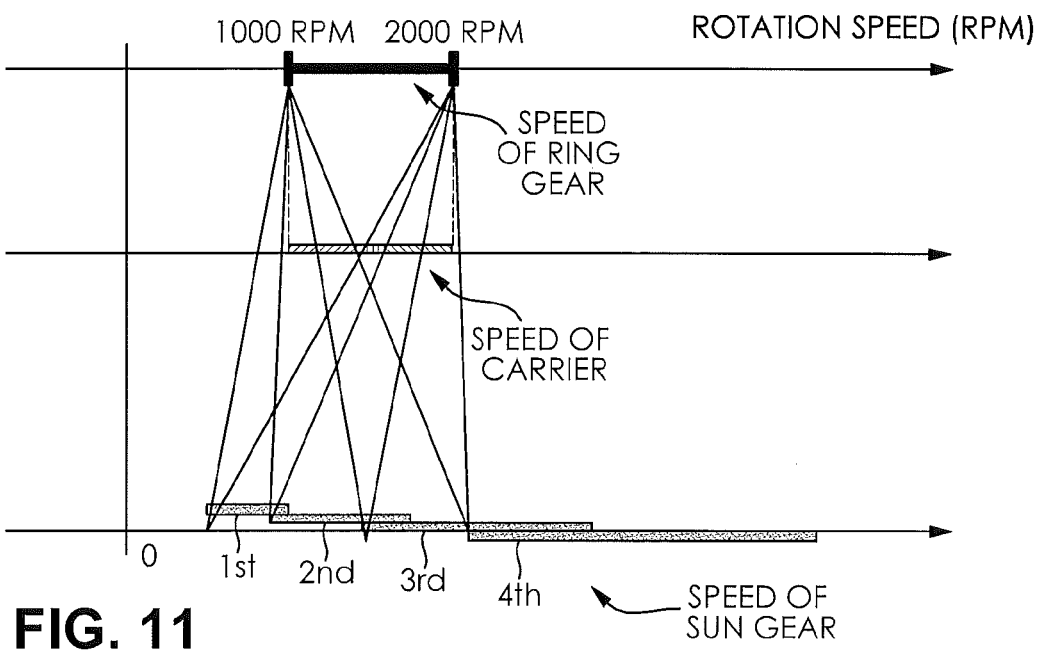
FIG. 11 is a speed diagram which illustrates an exemplary gear ratio spread of a plurality of components of a planetary gearset forming a portion of the vehicle driveline of the embodiments of the invention shown in FIGS. 1-6.

FIG. 10 is a speed diagram that illustrates that for the smallest state of charge of the flywheel 150, 250, 350, 450, 550, 650 (a rotational speed of about 30,000 revolutions per minute, for example), a gear ratio can be chosen to cover the speed range of the carrier 114, 114', 314, 414, 514, 114''''' (the input for the transmission 108, 108', 108", 108''', 108'''', 108'''''). As shown in FIG. 10, a combination of the $2^{nd}$ gear and the 4th gear of the accessory transmission 142, 242, 342, 442, 542, 642 cover the speed differences between the power source 104, 104', 104", 104''', 104'''', 604 and the flywheel 150, 250, 350, 450, 550, 650. The $3^{rd}$ gear and the $4^{th}$ gear provide an additional range for the accessory transmission 142, 242, 342, 442, 542, 642, and are shown in FIG. 11. The range of operating speeds of the gears of the accessory transmission 142, 242, 342, 442, 542, 642 are shown in FIG. 11, which illustrates that a desired speed range of the carrier 114, 114', 314, 414, 514, 114''''' may be covered by one, two, or even three of the gears of the accessory transmission 142, 242, 342, 442, 542, 642. Such flexibility can be used to choose a different ratio between the power coming from the power source 104, 104', 104", 104', 104'''', 604 and power coming from the flywheel 150, 250, 350, 450, 550, 650 or to optimize the performance or efficiency of the power source 104, 104', 104", 104''', 104'''', 604.

Figure 12:
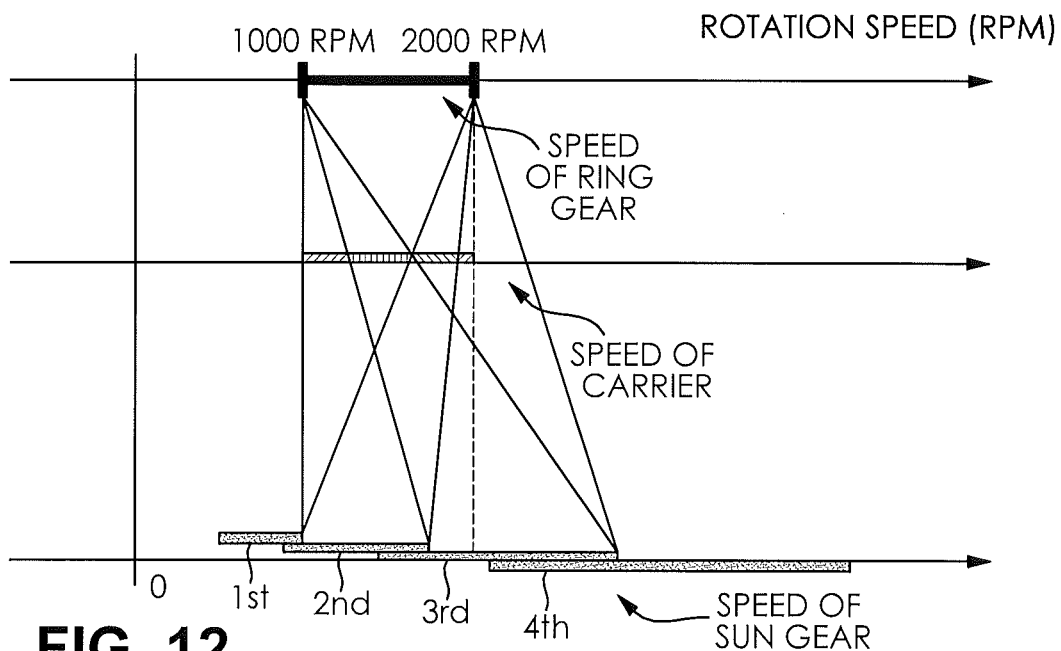
FIG. 12 is a speed diagram which illustrates an exemplary gear ratio spread of a plurality of components of a planetary gearset forming a portion of the vehicle driveline of the embodiments of the invention shown in FIGS. 1-6.

FIG. 12 is a speed diagram that illustrates that for a greatest state of charge of the flywheel 150, 250, 350, 450, 550, 650, a gear ratio can be chosen to cover the speed range of the carrier 114, 114', 314, 414, 514, 114'''''. As shown in FIG. 12, a combination of the 1st gear, the $2^{nd}$ gear, and the 3rd gear of the accessory transmission 142, 242, 342, 442, 542, 642 cover the speed range of the carrier 114, 114', 314, 414, 514, 114'''''. The $4^{th}$ gear provides an additional range for the accessory transmission 142, 242, 342, 442, 542, 642 and is not represented in FIG. 12.

Several configurations are possible for each combination of the vehicle speed and the state of charge of the flywheel 150, 250, 350, 450, 550, 650. The selection of the gears engaged in the transmission 108, 108', 108'', 108''', 108'''', 108''''' and in the accessory transmission 142, 242, 342, 442, 542, 642, as well as the speed of the power source 104, 104', 104'', 104''', 104''''', 604 is determined by an optimized control algorithm, which is explained hereinbelow.

In the locked planetary acceleration mode, the clutch between the ring gear 112, 112', 312, 412, 512, 112'''''' and the carrier 114, 114', 314, 414, 514, 114'''''' is engaged, which places the planetary gearset 128, 128', 328, 428, 528, 128'''''' in the locked condition. In the locked condition, the sun gear 118, 118', 318, 418, 518, 118'''''', the ring gear 112, 112', 312, 412, 512, 112'''''', and the carrier 114, 114', 314, 414, 514, 114'''''' of the planetary gearset 128, 128', 328, 428, 528, 128'''''' all rotate at the same speed.

Unlike the dynamics that are present during the active planetary acceleration mode (in which the torque ratio is fixed and the speed ratio can be chosen), the locked planetary acceleration mode fixes the speed ratio of the planetary gearset 128, 128', 328, 428, 528, 128'''''' to one to one and allows the torque ratio to be distributed between the power source 104, 104', 104'', 104''', 104'''', 604 (via the ring gear 112, 112', 312, 412, 512, 112'''''') and the flywheel 150, 250, 350, 450, 550, 650 (via the sun gear 118, 118', 318, 418, 518, 118''''''). The power transferred from the flywheel 150, 250, 350, 450, 550, 650 is determined by an amount of engagement of the accessory clutch 140, 140', 340, 440, 540, 640. To have various torque distribution ratios (as non-limiting examples, all of the power delivered by the driveline 100, 200, 300, 400, 500, 600 may come from the flywheel 150, 250, 350, 450, 550, 650, all of the power delivered by the driveline 100, 200, 300, 400, 500, 600 may come from the power source 104, 104', 104'', 104''', 104'''', 604, or any combination of the flywheel 150, 250, 350, 450, 550, 65 and the power source 104, 104', 104'', 104''', 104'''', 604), the planetary gearset 128, 128', 328, 428, 528, 128'''''' needs to be in the locked condition. The locked condition is also necessary when the rotational speed of the flywheel 150, 250, 350, 450, 550, 650 is below a minimal operating speed of the flywheel 150, 250, 350, 450, 550, 650 (and thus unable to provide power to the driveline 100, 200, 300, 400, 500, 600).

Figure 13:
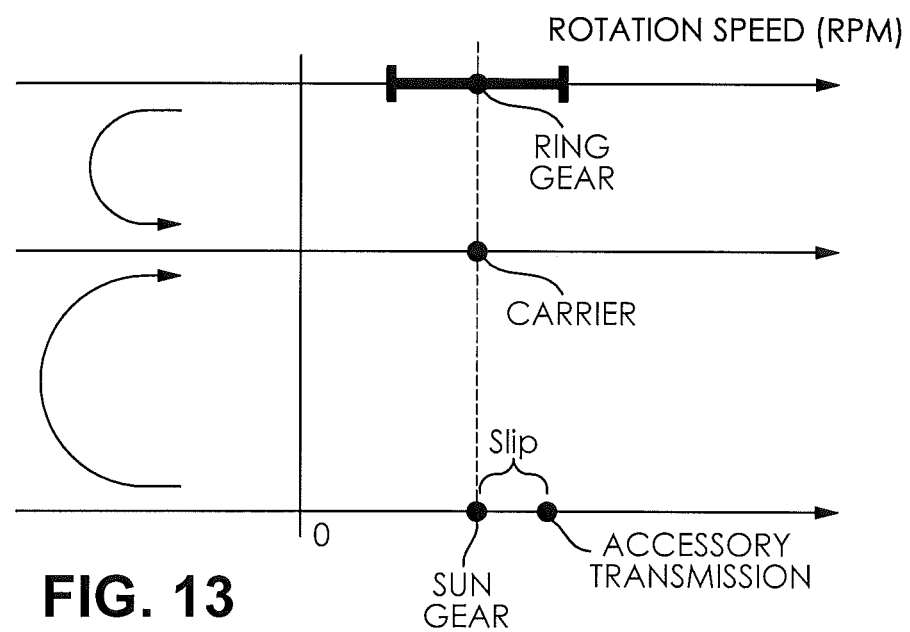
FIG. 13 is a speed diagram which illustrates a speed of a plurality of components of a planetary gearset forming a portion of the vehicle driveline of the embodiments of the invention shown in FIGS. 1-6, the speed of the plurality of components shown during a locked planetary acceleration mode.

Engaging the lockout clutch 124, 124', 324, 424, 524, 124'''''' between the ring gear 112, 112', 312, 412, 512, 112'''''' and the carrier 114, 114', 314, 414, 514, 114'''''' locks the planetary gearset 128, 128', 328, 428, 528, 128' '''', and the ring gear 112, 112', 312, 412, 512, 112'''''', the carrier 114, 114', 314, 414, 514, 114'''''', and the sun gear 118, 118', 318, 418, 518, 118'''''' all rotate at the same speed. By selecting an appropriate gear of the transmission 108, 108', 108'', 108''', 108'''', 108''''' and by variably engaging the accessory clutch 140, 140', 340, 440, 540, 640, it is possible to regulate the power (or torque as the speeds of the ring gear 112, 112', 312, 412, 512, 112'''''', the carrier 114, 114', 314, 414, 514, 114'''''', and the sun gear 118, 118', 318, 418, 518, 118'''''' are equal) delivered by the flywheel 150, 250, 350, 450, 550, 650 through the sun gear 118, 118', 318, 418, 518, 118'''''' and the power delivered by the power source 104, 104', 104'', 104''', 104'''', 604 through the ring gear 112, 112', 312, 412, 512, 112''''''. FIG. 13 is a speed diagram that illustrates the locked planetary acceleration mode.

As explained hereinabove, control of the power flow through the driveline 100, 200, 300, 400, 500, 600 requires an optimization based on a plurality of system parameters. A driveline control algorithm can be divided into two modes; a braking mode and an acceleration mode.

When the vehicle driveline control algorithm is in the braking mode, the objective is to store as much kinetic energy of the vehicle as possible in the flywheel 150, 250, 350, 450, 550, 650. An amount of torque generated by braking the vehicle is distributed according to the following equations:

$$T_{brake} = T_{ICE} + T_{KERS}$$

where $T_{ICE} = f(\omega_{ICE})$ and $T_{KERS} = f(P_{clutch})$

Accordingly, since the ring gear 112, 112', 312, 412, 512, 112'''''', the carrier 114, 114', 314, 414, 514, 114'''''', and the sun gear 118, 118', 318, 418, 518, 118'''''' are rotating at the same speed (in the braking mode the lockout clutch 124, 124', 324, 424, 524, 124'''''' between the ring gear 112, 112', 312, 412, 512, 112'''''' and the carrier 114, 114', 314, 414, 514, 114'''''' is engaged), the power source 104, 104', 104'', 104''', 104'''', 604 rotates at a specific rotational speed and an amount of braking torque applied by the power source 104, 104', 104'', 104''', 104'''', 604 is a direct function of the speed of the power source 104, 104', 104'', 104''', 104'''', 604. A remainder of the braking torque is applied to the flywheel 150, 250, 350, 450, 550, 650, depending on the pressure applied to the accessory clutch 140, 140', 340, 440, 540, 640.

In the active planetary acceleration mode, the lockout clutch 124, 124', 324, 424, 524, 124'''''' between the ring gear 112, 112', 312, 412, 512, 112'''''' and the carrier 114, 114', 314, 414, 514, 114'''''' is disengaged. The flexibility of the driveline 100, 200, 300, 400, 500, 600 including the accessory transmission 142, 242, 342, 442, 542, 642 and the transmission 108, 108', 108'', 108''', 108'''', 108''''' defines an operating window (as shown in the above speed diagrams) for each component of the planetary gearset 128, 128', 328, 428, 528, 128''''''. As a result, for a specific operating speed of the driveline 100, 200, 300, 400, 500, 600, there will be many possibilities for the rotational speeds of the ring gear 112, 112', 312, 412, 512, 112'''''', the carrier 114, 114', 314, 414, 514, 114'''''', and the sun gear 118, 118', 318, 418, 518, 118'''''' based on the selection of gear ratios of the accessory transmission 142, 242, 342, 442, 542, 642 and the transmission 108, 108', 108'', 108', 108'''', 108'''''.

Additionally, there are speed limitations for the power source 104, 104', 104'', 104''', 104'''', 604 (the power source 104, 104', 104'', 104', 104'''', 604 may have a required idle speed and a maximum operating speed), the flywheel 150, 250, 350, 450, 550, 650 (the flywheel 150, 250, 350, 450, 550, 650 may have a minimum operating state of charge speed and a maximum operating state of charge speed), amongst other limitations by other components of the driveline 100, 200, 300, 400, 500, 600 which may reduce the possible selection of gear ratios of the accessory transmission 142, 242, 342, 442, 542, 642 and the transmission 108, 108', 108'', 108''', 108'''', 108'''''. In order to obtain an optimal operation of the power source 104, 104', 104'', 104''', 104''''', 604 and an instantaneous desired state of charge of the flywheel 150, 250, 350, 450, 550, 650, the driveline 100, 200, 300, 400, 500, 600 control algorithm determines the speeds of the components of the planetary gearset 128, 128', 328, 428, 528, 128'''''' and thus the power distribution in the driveline 100, 200, 300, 400, 500, 600.

In the locked planetary acceleration mode, the lockout clutch 124, 124', 324, 424, 524, 124'''''' between the ring gear 112, 112', 312, 412, 512, 112'''''' and the carrier 114, 114', 314, 414, 514, 114'''''' is engaged, which places the planetary gearset 128, 128', 328, 428, 528, 128'''''' in the locked condition. When the vehicle is accelerating with the planetary gearset 128, 128', 328, 428, 528, 128'''''' placed in the locked condition, the rotational speed of the carrier 114, 114', 314, 414, 514, 114'''''' is determined by the speed of the vehicle and the ratio selected in the transmission 108, 108',

108", 108'", 108"", 108""". The ratio in the transmission 108, 108', 108", 108'", 108"", 108 can also be chosen so that the flywheel 150, 250, 350, 450, 550, 650 rotates faster than the planetary gearset 128, 128', 328, 428, 528, 128"", resulting in power being transferred from the flywheel 150, 250, 350, 450, 550, 650 to the driveline 100, 200, 300, 400, 500, 600. The ratios of the accessory transmission 142, 242, 342, 442, 542, 642 and the transmission 108, 108', 108", 108'", 108"", 108"" are chosen to make a compromise based on an operating speed of the power source 104, 104', 104", 104'", 104"", 604 (as non-limiting examples, the ratios may be selected to optimize vehicle performance or increase an efficiency of the vehicle) and an amount of slipping present in the lockout clutch 124, 124', 324, 424, 524, 124'"". As a non-limiting example, a gear ratio may be selected that results in a bigger slip of the lockout clutch 124, 124', 324, 424, 524, 124'"", and thus bigger losses, but bringing the power source 104, 104', 104", 104'", 104"", 604 into a higher performing or more fuel efficient operational speed.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A driveline for a vehicle, comprising:
   a power source;
   a planetary gearset having a sun gear, a carrier having a plurality of planet gears rotatably disposed thereon, and a ring gear, the power source in driving engagement with the ring gear;
   a lockout clutch disposed axially within the planetary gearset, axially between the ring gear and the carrier, the lockout clutch positioned to place the planetary gearset in a locked out condition when the lockout clutch is placed in an engaged position;
   a transmission in selective driving engagement with the carrier; and
   a kinetic energy recovery system comprising an accessory clutch and a flywheel, wherein the accessory clutch facilitates selective driving engagement between the flywheel and the sun gear when the accessory clutch is placed in an engaged position, and the lockout clutch and the accessory clutch are selectively engaged to facilitate a transfer of energy from one of the transmission and the flywheel to a remaining one of the transmission and the flywheel.

2. The driveline for a vehicle according to claim 1, wherein the kinetic energy recovery system further comprises an accessory transmission in selective driving engagement with the accessory clutch and the flywheel.

3. The driveline for a vehicle according to claim 1, wherein the kinetic energy recovery system further comprises a flywheel housing and a magnetic coupling, the magnetic coupling having a first portion in driving engagement with the accessory clutch and a second portion disposed in the flywheel housing and in driving engagement with the flywheel.

4. The driveline for a vehicle according to claim 3, wherein the kinetic energy recovery system further comprises an accessory transmission in driving engagement with the accessory clutch and the first portion of the magnetic coupling, the flywheel housing and the magnetic coupling disposed about and radially outwardly from the accessory transmission.

5. The driveline for a vehicle according to claim 3, wherein the kinetic energy recovery system further comprises an accessory transmission in driving engagement with the accessory clutch and the first portion of the magnetic coupling, the magnetic coupling disposed within and radially inwardly from at least a portion of the accessory transmission.

6. The driveline for a vehicle according to claim 3, wherein the first portion and the second portion of the magnetic coupling form a drive ratio adjusting device.

7. The driveline for a vehicle according to claim 3, wherein the flywheel housing is a permanently sealed housing having a vacuum drawn thereon.

8. The driveline for a vehicle according to claim 1, wherein the kinetic energy recovery system further comprises a ratio adapter in driving engagement with the accessory clutch and the flywheel.

9. The driveline for a vehicle according to claim 1, further comprising an electric motor and a two position clutch having a first position and a second position, the two position clutch in the first position facilitating driving engagement between the electric motor and the power source and the two position clutch in the second position facilitating driving engagement between the electric motor and the flywheel.

10. The driveline for a vehicle according to claim 9, further comprising an starter motor and battery, the starter motor in driving engagement with the power source and the starter motor and the electric motor in electrical communication with the battery.

11. The driveline for a vehicle according to claim 1, wherein the power source is in driving engagement with the sun gear of the planetary gearset, the transmission is in driving engagement with the carrier of the planetary gearset, and the kinetic energy recovery system is in driving engagement with the ring gear of the planetary gearset.

12. A driveline for a vehicle, comprising:
   a power source;
   a planetary gearset having a sun gear, a carrier having a plurality of planet gears rotatably disposed thereon, and a ring gear, the power source in driving engagement with the ring gear;
   a lockout clutch disposed axially within the planetary gearset, axially between the ring gear and the carrier, the lockout clutch positioned to place the planetary gearset in a locked out condition when the lockout clutch is placed in an engaged position;
   a transmission in selective driving engagement with the carrier; and
   a kinetic energy recovery system comprising an accessory clutch, a flywheel, a flywheel housing, and a magnetic coupling having a first portion in driving engagement with the accessory clutch disposed adjacent the flywheel housing and a second portion disposed in the flywheel housing and in driving engagement with the flywheel, wherein the accessory clutch facilitates selective driving engagement between the flywheel and the sun gear when the accessory clutch is placed in an engaged position, and the lockout clutch and the accessory clutch are selectively engaged to facilitate a transfer of energy from one of the transmission and the flywheel to a remaining one of the transmission and the flywheel.

13. The driveline for a vehicle according to claim 12, wherein the kinetic energy recovery system further comprises a ratio adapter in selective driving engagement with the accessory clutch and the flywheel.

14. A method of operating a driveline for a vehicle, comprising the steps of:
- providing a power source;
- providing a planetary gearset having a sun gear, a carrier having a plurality of planet gears rotatably disposed thereon, and a ring gear, the power source in driving engagement with the ring gear;
- providing a lockout clutch disposed axially within the planetary gearset, axially between the ring gear and the carrier, the lockout clutch positioned to place the planetary gearset in a locked out condition when the lockout clutch is placed in an engaged position;
- providing a transmission in selective driving engagement with the carrier;
- providing a kinetic energy recovery system comprising an accessory clutch and a flywheel, the accessory clutch having an engaged position which facilitates driving engagement between the flywheel and the sun gear; and
- selectively engaging the lockout clutch and the accessory clutch to facilitate a transfer of energy from one of the transmission and the flywheel to a remaining one of the transmission and the flywheel.

* * * * *